(12) United States Patent
Martel et al.

(10) Patent No.: US 12,410,073 B2
(45) Date of Patent: Sep. 9, 2025

(54) SYSTEMS AND PROCESSES FOR DECONTAMINATING AN AQUEOUS FLOW CONTAMINATED WITH MUNITIONS CONTAMINANTS

(71) Applicant: INSTITUT NATIONAL DE LA RECHERCHE SCIENTIFIQUE, Quebec (CA)

(72) Inventors: Richard Martel, Quebec (CA); Luc Trepanier, Quebec (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 588 days.

(21) Appl. No.: 17/774,897

(22) PCT Filed: Oct. 9, 2020

(86) PCT No.: PCT/CA2020/051356
§ 371 (c)(1),
(2) Date: May 6, 2022

(87) PCT Pub. No.: WO2021/087599
PCT Pub. Date: May 14, 2021

(65) Prior Publication Data
US 2022/0402778 A1    Dec. 22, 2022

Related U.S. Application Data

(60) Provisional application No. 62/979,888, filed on Feb. 21, 2020, provisional application No. 62/932,886, filed on Nov. 8, 2019.

(51) Int. Cl.
*C02F 1/28* (2023.01)
*C02F 101/00* (2006.01)
(Continued)

(52) U.S. Cl.
CPC .............. *C02F 1/283* (2013.01); *C02F 1/281* (2013.01); *C02F 1/286* (2013.01);
(Continued)

(58) Field of Classification Search
None
See application file for complete search history.

(56) References Cited

U.S. PATENT DOCUMENTS

| | | | |
|---|---|---|---|
| 2003/0140785 A1* | 7/2003 | Koslow | A61L 2/0082 96/153 |
| 2006/0186053 A1* | 8/2006 | Bethke | B09C 1/002 210/688 |

(Continued)

OTHER PUBLICATIONS

Martel, Varfalvy, Trepanier and Cote, Preliminary Study of a New Site Design for Grenada, research report, Mar. 31, 2012, pp. 1-52, Canada.
Martel, Varfalvy, Trepanier, Dostie, Deschenes-Rancourt and Levesque, Study of Reactive Membranes for the Development of New Designs of Grenade Firing Ranges, research report, Mar. 31, 2013, pp. 1-82 pages. Canada.
(Continued)

*Primary Examiner* — Richard C Gurtowski
(74) *Attorney, Agent, or Firm* — Christopher A. Proskey; BrownWinick Law Firm

(57) ABSTRACT

Systems and processes for treating a contaminated aqueous flow which includes contaminants, such as munitions contaminants including metallic contaminants, energetic material contaminants, and/or propellant contaminants, are disclosed. The systems include an adsorption layer which includes bone char particulates, titanium dioxide particulates and/or aluminum oxide particulates which promotes adsorption of the contaminants upon contact of the contaminated stream and the adsorption layer so as to produce a treated aqueous flow, which is depleted in the munitions contaminants. Optionally, the adsorption layer can be buried in granulates particles so the contaminated aqueous water can percolate down through the earth and towards the adsorption layer, so the treated water can further percolate through the (Continued)

earth. The system can alternatively include more than one adsorption layer, which can be arranged in series or in parallel, in situ or ex situ.

21 Claims, 20 Drawing Sheets

(51) Int. Cl.
*C02F 101/20* (2006.01)
*C02F 103/06* (2006.01)

(52) U.S. Cl.
CPC .... *C02F 2101/003* (2013.01); *C02F 2101/20* (2013.01); *C02F 2103/06* (2013.01)

(56) References Cited

U.S. PATENT DOCUMENTS

| | | |
|---|---|---|
| 2013/0277298 A1 | 10/2013 | Sanocki et al. |
| 2017/0326478 A1 | 11/2017 | Noling et al. |

OTHER PUBLICATIONS

Martel, Trepanier, Batailler, Levesque and Benguit, Water Treatment Study of Bullet Catchers Effluent at the Nicosie Small Arm Range (CFB Valcartier), research report, Mar. 2020, pp. 1-228, Canada.

Martel, Lefebvre, Martel and Roy, Preliminary Soil and Groundwater Characterization Study at the CFAD Dundurn Explosives Facility (Saskatchewan), research report, Oct. 1996, pp. 1-66, Canada.

\* cited by examiner

SYSTEMS AND PROCESSES FOR DECONTAMINATING AN AQUEOUS FLOW CONTAMINATED WITH MUNITIONS CONTAMINANTS

RELATED PATENT APPLICATION(S)

The present application is a 371 of International Application No. PCT/CA2020/051356 which was filed on Oct. 9, 2020 the disclosure of which is hereby incorporated by reference, which claims priority from U.S. provisional patent application No. 62/932,886, filed Nov. 8, 2019 and entitled "SYSTEM AND PROCESS FOR DECONTAMINATING MILITARY TRAINING RANGES", the disclosure of which is hereby incorporated by reference, and from U.S. provisional patent application No. 62/979,888, filed Feb. 21, 2020 and entitled "SYSTEMS AND PROCESSES FOR DECONTAMINATING MILITARY TRAINING RANGES".

TECHNICAL FIELD

The technical field relates to systems and processes for decontaminating an aqueous flow contaminated with munitions contaminants. More particularly, the technical field relates to systems and processes for treating an aqueous flow contaminated with munitions contaminants which percolates through the earth, for example, under a military training range (e.g., grenade, anti-tank, small arms, demolition, etc.), a destruction site or a munition or metal production site.

BACKGROUND

The use of energetic materials, such as trimethylenetrinitramine (RDX), cyclotrimethylenetrinitramine (HMX), trinitrotoluene (TNT), dinitrotoluene (DNT) (such as 2,4 DNT and 2,6 DNT), nitroglycerine (NG), etc.; of metals, such as antimony (Sb), lead (Pb), copper (Cu), zinc (Zn), cadmium (Cd), etc.; and/or of propellant, such as perchlorate ($ClO_4$), in the construction of munitions has led to an international warning on possible soil, surface water, and groundwater contamination about military training ranges (e.g., grenade, anti-tank, small arms, demolition, etc.), destruction sites or munition or metal production sites, where these munitions are used, destroyed or produced.

Indeed, for example, destruction sites are intended for the destruction of unused munitions or munitions which are being tested. During these destruction activities, munitions can be exploded and/or burned. The munitions contaminants (e.g., energetic material contaminants, metallic contaminants, propellant contaminants, etc.) are therefore dispersed on the ground of the destruction site.

Allowing precipitation water, such as rain or melting snow, to fall on these debris produces a contaminated aqueous flow which causes the munitions contaminants to percolate down through the earth. This can contaminate the soil, the surface water, and the groundwater located about the military training range, the destruction site or the munition production site. The energetic material contaminants, metallic contaminants and/or propellant contaminants, which can be deemed toxic and carcinogenic, can therefore affect the surrounding environment. For example, aquatic life can be disturbed and drinking water can include notable contents of these munitions contaminants.

There are still a number of challenges in the decontamination of an aqueous flow contaminated with munitions contaminants that percolates through the earth underneath such military training ranges, destruction sites or munition production sites.

SUMMARY

In one implementation, there is provided a system for treating a contaminated aqueous flow comprising water and munitions contaminants, the system comprising: granulate particles allowing the contaminated aqueous flow to percolate down therethrough; and an adsorption layer buried in the granulate particles and comprising at least one of bone char particulates, titanium dioxide particulates or aluminum oxide particulates for promoting adsorption of the munitions contaminants upon contact of the contaminated aqueous flow and the adsorption layer to produce a treated aqueous flow depleted in the munitions contaminants to further percolate downwardly into the granulate particles.

In one implementation, the munitions contaminants comprise energetic material contaminants.

In one implementation, the energetic material contaminants comprise trimethylenetrinitramine (RDX).

In one implementation, the energetic material contaminants comprise cyclotrimethylenetrinitramine (HMX).

In one implementation, the energetic material contaminants comprise trinitrotoluene (TNT).

In one implementation, the energetic material contaminants comprise dinitrotoluene (DNT).

In one implementation, the energetic material contaminants comprise nitroglycerine (NG).

In one implementation, the munitions contaminants comprise metallic contaminants.

In one implementation, the metallic contaminants comprise antimony (Sb).

In one implementation, the metallic contaminants comprise lead (Pb).

In one implementation, the metallic contaminants comprise copper (Cu).

In one implementation, the metallic contaminants comprise zinc (Zn).

In one implementation, the metallic contaminants comprise cadmium (Cd).

In one implementation, the munitions contaminants comprise propellant contaminants.

In one implementation, the propellant contaminants comprise perchlorate.

In one implementation, the contaminated aqueous flow has a munitions contaminants content above a threshold provided by the drinking water guidelines.

In one implementation, the contaminated aqueous flow has a munitions contaminants content above a threshold provided by the aquatic life guidelines.

In one implementation, the treated aqueous flow has a munitions contaminants content below a threshold provided by the drinking water guidelines.

In one implementation, the treated aqueous flow has a munitions contaminants content below a threshold provided by the aquatic life guidelines.

In one implementation, the adsorption layer is buried in the granulate particles in an unsaturated zone of the earth.

In one implementation, the adsorption layer is buried in the granulate particles in a saturated zone of the earth.

In one implementation, the adsorption layer has a thickness so as to produce the treated aqueous with the munitions contaminants content below the threshold provided by the drinking water guidelines or the aquatic life guidelines.

In one implementation, the adsorption layer comprises a support structure for containing the at least one of the bone char particulates, the titanium dioxide particulates or the aluminum oxide particulates therein.

In one implementation, the support structure comprises a plurality of compartments, the compartments each comprising sidewalls defining an opened top and an opened bottom.

In one implementation, the sidewalls comprise spaced apart apertures allowing the at least one of the bone char particulates, the titanium dioxide particulates or the aluminum oxide particulates to travel from one of the compartments to an adjacent one of the compartments.

In one implementation, the adsorption layer comprises bone char particulates, the bone char particulates having a bone char granulometry and the granulate particles having a granulate particles granulometry being different than the bone char granulometry so as to prevent the bone char particulates to migrate into the granulate particles.

In one implementation, the bone char granulometry is between about 0.1 mm and about 3.0 mm, or between about 0.5 mm and about 2.0 mm.

In one implementation, the granulate particles comprise sand.

In one implementation, the granulate particles comprise at least one of gravel or rocks.

In one implementation, the granulate particles or the adsorption layer comprise activated carbon.

In one implementation, the granulate particles or the adsorption layer comprise peat moss.

In one implementation, the granulate particles or the adsorption layer comprise coconut coir.

In one implementation, the bone char particulates have a relative density of between about 650 kg/m$^3$ and about 850 kg/m$^3$.

In one implementation, the bone char particulates have a carbon content of between about 7% and about 13%.

In one implementation, the bone char particulates have a tricalcium phosphate content of between about 60% and about 85%.

In one implementation, the system further comprises an impermeable membrane buried in the granulate particles and being impervious to the contaminated aqueous flow, the impermeable membrane being configured so as to redirect the contaminated aqueous flow contacting the impermeable membrane towards the adsorption layer.

In one implementation, the adsorption layer is oriented substantially horizontally.

In one implementation, the adsorption layer is oriented substantially vertically.

In one implementation, there is provided a process for treating a contaminated aqueous flow comprising water and munitions contaminants, the process comprising: contacting the contaminated aqueous flow with an adsorption layer comprising at least one of bone char particulates, titanium dioxide particulates or aluminum oxide particulates for promoting adsorption of the munitions contaminants and producing a treated aqueous flow depleted in the munitions contaminants.

In one implementation, the process further comprises burying the adsorption layer in granulate particles, below a munitions supporting surface.

In one implementation, the process further comprises: providing munitions on the munitions supporting surface; destroying the munitions to produce destroyed munitions debris comprising the munitions contaminants; allowing a flow of water to fall on the destroyed munitions debris to produce the contaminated aqueous flow; and allowing the contaminated aqueous flow to percolate down into the granulate particles towards the adsorption layer.

In one implementation, the flow of water comprises precipitation water.

In one implementation, the flow of water comprises irrigation water.

In one implementation, the munitions contaminants comprise energetic material contaminants.

In one implementation, the energetic material contaminants comprise trimethylenetrinitramine (RDX).

In one implementation, the energetic material contaminants comprise cyclotrimethylenetrinitramine (HMX).

In one implementation, the energetic material contaminants comprise trinitrotoluene (TNT).

In one implementation, the energetic material contaminants comprise dinitrotoluene (DNT).

In one implementation, the energetic material contaminants comprise nitroglycerine (NG).

In one implementation, the munitions contaminants comprise metallic contaminants.

In one implementation, the metallic contaminants comprise antimony (Sb).

In one implementation, the metallic contaminants comprise lead (Pb).

In one implementation, the metallic contaminants comprise copper (Cu).

In one implementation, the metallic contaminants comprise zinc (Zn).

In one implementation, the metallic contaminants comprise cadmium (Cd).

In one implementation, the munitions contaminants comprise propellant contaminants.

In one implementation, the propellant contaminants comprise perchlorate.

In one implementation, the contaminated aqueous flow has a munitions contaminants content above a threshold provided by the drinking water guidelines.

In one implementation, the contaminated aqueous flow has a munitions contaminants content above a threshold provided by the aquatic life guidelines.

In one implementation, the treated aqueous flow has a munitions contaminants content below a threshold provided by the drinking water guidelines.

In one implementation, the treated aqueous flow has a munitions contaminants content below a threshold provided by the aquatic life guidelines.

In one implementation, the process further comprises burying an impermeable membrane in the granulate particles adjacent to the adsorption layer for directing the contaminated aqueous flow towards the adsorption layer.

In one implementation, the contaminated aqueous flow is contacted with the at least one of the bone char particulates, the titanium dioxide particulates or the aluminum oxide particulates for a contact time sufficient to produce the treated aqueous flow having the munitions contaminants content below the threshold provided by the drinking water guidelines or the aquatic life guidelines.

In one implementation, the contact time is between about 10 minutes and about 10 hours.

In one implementation, there is provided a system for treating a first contaminated aqueous flow comprising water and first munitions contaminants and a second contaminated aqueous flow comprising water and second munitions contaminants to decontaminate interstitial water that percolates through the earth under a destruction area, where munitions are exploded to produce the first munitions contaminants, and a burning area, where munitions are burned to produce the second munitions contaminants, the first contaminated aqueous flow being obtained by allowing a flow of water to fall on the first munitions contaminants, the second contaminated aqueous flow being obtained by allowing the flow of water to fall on second munitions contaminants, the system comprising: granulate particles allowing the first contaminated aqueous flow to percolate down therethrough from the destruction area; a first adsorption layer buried in the granulate particles and comprising at least one of bone char particulates, titanium dioxide particulates or aluminum oxide particulates for promoting adsorption of the first munitions contaminants upon contact of the first contaminated aqueous flow percolating towards the first adsorption layer and the first adsorption layer to produce a first treated aqueous flow depleted in the first munitions contaminants to further percolate into the granulate particles; and a second adsorption layer comprising at least one of bone char particulates, titanium dioxide particulates or aluminum oxide particulates for promoting adsorption of the second munitions contaminants upon contact of the second contaminated aqueous flow and the second adsorption layer to produce a second treated aqueous flow depleted in the second munitions contaminants, and optionally, for promoting adsorption of the first munitions contaminants upon contact of the first contaminated aqueous flow and the second adsorption layer to produce a second treated aqueous flow depleted in the first munitions contaminants and in the second munitions contaminants.

In one implementation, the system further comprises an impermeable membrane impervious to the first contaminated aqueous flow being buried in the granulate particles, the impermeable membrane being configured to collect the first contaminated aqueous flow percolating through the granulate material towards the impermeable membrane for flow towards the second adsorption layer to produce the second treated aqueous flow depleted in the first munitions contaminants and in the second munitions contaminants.

In one implementation, the first adsorption layer is buried in the granulate particles in vertical alignment with the destruction area.

In one implementation, the impermeable membrane is buried in the granulate particles in vertical alignment with the destruction area.

In one implementation, the burning area comprises a floor having an outlet in a lower section thereof for expelling the second contaminated aqueous flow from the burning area.

In one implementation, the system further comprises a first pipe having a first end in fluid communication with the outlet of the floor, and a second end in fluid communication with the second adsorption layer, allowing the second contaminated aqueous flow to flow therethrough and towards the second adsorption layer.

In one implementation, the system further comprises a second pipe having a first end in fluid communication with the impermeable membrane and a second end in fluid communication with the second adsorption layer, allowing the first contaminated aqueous flow percolating towards the impermeable membrane to flow therethrough and towards the second adsorption layer.

In one implementation, the impermeable membrane has a membrane outlet formed in a membrane lower section thereof, the first end of the second pipe being coupled therewith.

In one implementation, the impermeable membrane defines a downward slope to allow the first contaminated aqueous flow to flow towards the membrane outlet and then, towards the second pipe.

In one implementation, the second adsorption layer is located below from the impermeable membrane, allowing the second pipe to be filled by gravity.

In one implementation, the second adsorption layer is located below from the floor of the burning area, allowing the first pipe to be filled by gravity.

In one implementation, the impermeable membrane comprises polyethylene.

In one implementation, the impermeable membrane comprises bentonite.

In one implementation, the impermeable membrane extends outwardly from a periphery of the first adsorption layer.

In one implementation, the adsorption layer extends outwardly from a periphery of the impermeable membrane.

In one implementation, the first adsorption layer is buried deeper in the granulate particles than the impermeable membrane.

In one implementation, the impermeable membrane is buried deeper in the granulate particles than the first adsorption layer.

In one implementation, the first adsorption layer and the impermeable membrane are buried at substantially the same depth in the granulate particles from the munitions supporting surface.

In one implementation, the impermeable membrane is configured to prevent an overflow of the first contaminated aqueous flow that has been collected by the impermeable membrane to reach at least one of the first adsorption layer or the granulate particles.

In one implementation, the impermeable membrane is buried in the granulate particles so as to collect the first treated aqueous flow percolating through the granulate particles for supply to the second adsorption layer.

In one implementation, the system further comprises a pumping system for pumping the first contaminated aqueous flow collected by the impermeable membrane towards the second adsorption layer via the second pipe.

In one implementation, the system further comprises a water treatment unit configured to receive and treat the first and the second contaminated aqueous flows, the water treatment unit comprising the second adsorption layer comprising the second bone char particulates.

In one implementation, the water treatment unit comprises: an inlet pipe having a first end for receiving the first and the second contaminated aqueous flow, and a second end, the inlet pipe being configured to expel the first and the second contaminated aqueous flow towards the second adsorption layer; and an outlet pipe having a first end and a second end for expelling the treated water flow depleted in the first and/or the second munitions contaminants therefrom, the outlet pipe being configured to receive the treated aqueous flow depleted in the munitions contaminants produced by the second adsorption layer for flow therethrough.

In one implementation, the inlet pipe comprises spaced apart outlet apertures along a length thereof for allowing the first and the second contaminated aqueous flows to flow therethrough; and the outlet pipe comprises spaced apart inlet apertures along a length thereof for allowing the second treated water flow to flow therethrough from the second adsorption layer, thus allowing the first and the second contaminated aqueous flows to flow from the inlet pipe, through the spaced apart outlet apertures so as to percolate through the second adsorption layer to allow the second treated aqueous flow produced to flow through the spaced apart inlet apertures of the outlet pipe and through the outlet pipe towards the second end thereof.

In one implementation, the inlet pipe is buried in a first layer of particles.

In one implementation, the outlet pipe is buried in a second layer of particles.

In one implementation, the outlet pipe and the inlet pipe are horizontally oriented.

In one implementation, the outlet pipe is in vertical alignment with the inlet pipe.

In one implementation, the inlet pipe is located below the outlet pipe and the second adsorption layer is provided between the first and the second layers of granulate particles.

In one implementation, the second end of the inlet pipe is capped.

In one implementation, the first end of the outlet pipe is capped.

In one implementation, the system further comprises a first flowmeter configured in fluid communication with the first contaminated aqueous flow.

In one implementation, the system further comprises a second flowmeter configured in fluid communication with the first treated aqueous flow.

In one implementation, the system further comprises a third flowmeter configured in fluid communication with the second contaminated aqueous flow.

In one implementation, the system further comprises a fourth flowmeter configured in fluid communication with the second treated aqueous flow.

In one implementation, the system further comprises a first sampling unit configured in fluid communication with the first contaminated aqueous flow for collecting data on the munitions contaminants content of the first contaminated aqueous flow.

In one implementation, the system further comprises a second sampling unit configured in fluid communication with the first treated aqueous flow for collecting data on the munitions contaminants content of the first treated aqueous flow.

In one implementation, the system further comprises a third sampling unit configured in fluid communication with the second contaminated aqueous flow for collecting data on the munitions contaminants content of the second contaminated aqueous flow.

In one implementation, the system further comprises a fourth sampling unit configured in fluid communication with the second treated aqueous flow for collecting data on the munitions contaminants content of the second treated aqueous flow.

In one implementation, the granulometry of the at least one of the bone char particulates, the titanium dioxide particulates or the aluminum oxide particulates is between about 0.1 mm and about 3.0 mm, or between about 0.5 mm and about 2.0 mm.

In one implementation, the system further comprises an impermeable membrane impervious to the first contaminated aqueous flow being buried in the granulate particles, the impermeable membrane being configured to provide direction of the first contaminated aqueous flow which percolates through the granulate particles towards the first adsorption layer.

In one implementation, there is provided an adsorption layer for treating a contaminated aqueous flow comprising water and munitions contaminants, the adsorption layer comprising: at least one of bone char particulates, titanium dioxide particulates or aluminum oxide particulates for promoting adsorption of the munitions contaminants upon contact of the contaminated aqueous flow and the at least one of the bone char particulates, the titanium dioxide particulates or the aluminum oxide particulates to produce a treated aqueous flow depleted in the munitions contaminants.

In one implementation, there is provided the use of at least one of bone char particulates, titanium dioxide particulates and aluminum oxide particulates for treating a contaminated aqueous flow comprising water and munitions contaminants.

DETAILED DESCRIPTION

Figure 1:
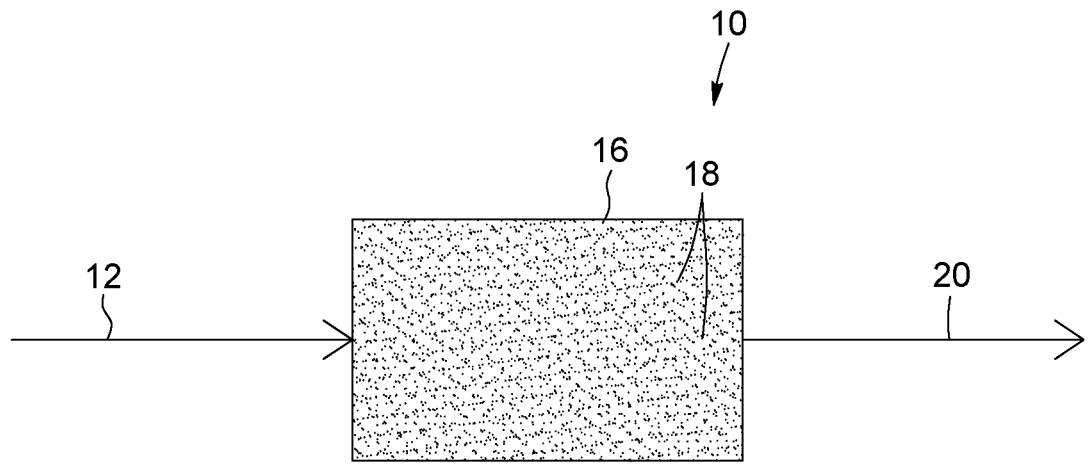
FIG. 1 schematically illustrates a system for treating a contaminated aqueous flow in accordance with one implementation.

The systems and processes described herein allow for treating a contaminated aqueous flow, which includes water and contaminants, such as metallic contaminants, munitions contaminants and/or propellant contaminants, by contacting the contaminated aqueous flow with an adsorption layer that includes bone char particulates, titanium dioxide ($TiO_2$) particulates and/or aluminum oxide ($Al_2O_3$) particulates, which are known as alumina particulates or activated alumina particulates, so as to promote adsorption of the contaminants to produce a treated aqueous flow depleted in the contaminants. For example, the metallic contaminants can include antimony (Sb), lead (Pb), copper (Cu), zinc (Zn), cadmium (Cd), or any other metallic contaminants or any combination thereof.

For example, the systems and processes described herein can facilitate decontaminating an aqueous flow contaminated with munitions contaminants that percolates underneath, or about, a military training range, a destruction site or a munition production site and thus, the groundwater found under, or about, the military training range, destruction site or munition production site. In one scenario, the adsorption layer which includes bone char particulates, titanium dioxide ($TiO_2$) particulates and/or aluminum oxide ($Al_2O_3$) particulates can be buried in the ground. For example, the adsorption layer can be buried underneath a destruction area and/or a burning area, where munitions can be safely destroyed, exploded and/or burned. Indeed, destroying the munitions by exploding and/or burning leaves exploded munitions components and/or burned munitions components (i.e., debris), which can include the munitions contaminants, such as metallic contaminants, energetic material contaminants and/or propellant contaminants, on the ground. Allowing a flow of water, such as natural precipitation (e.g., rain, melting snow) and/or water from an irrigation system (e.g., sprinklers), to fall on these debris produces the contaminated aqueous flow, which can percolate down through the earth, and towards the adsorption layer. Indeed, the adsorption layer allows the munitions contaminants which are present in the contaminated aqueous flow to adhere to the surface of the bone char particulates, titanium dioxide particulates and/or aluminum oxide particulates, at least in part, so as to create a film of the adsorbate (i.e., the munitions contaminants) on the surface of the adsorbent (i.e., the bone char particulates, the titanium dioxide particulates and/or the aluminum oxide particulates).

The treated aqueous flow that is produced can further percolate down through the granulate particles with the interstitial water, toward, for example, the phreatic table. Alternatively, the treated water can reach the surface water (e.g., a lake, a ditch, a creek, a river, an ocean).

Optionally, the contaminated water, instead of naturally percolating down into the ground, can be collected and supplied to an adsorption layer or material that comprises bone char particulates, titanium dioxide particulates and/or aluminum oxide particulates (being part of a water treatment unit, for example), where it can be contacted with the bone char particulates, the titanium dioxide particulates and/or the aluminum oxide particulates so as to produce the treated aqueous flow, which can then be supplied to a water disposal site, as it will be described in more details below.

As mentioned above, the munitions contaminants can include energetic material contaminants, such as trimethylenetrinitramine (RDX), cyclotrimethylenetrinitramine (HMX), trinitrotoluene (TNT), dinitrotoluene (DNT) (such as 2,4 DNT and 2,6 DNT), nitroglycerine (NG), or various other energetic material contaminants or any combination thereof. The munitions contaminants can also include metallic contaminants, such as antimony (Sb), lead (Pb), copper (Cu), zinc (Zn), cadmium (Cd), various other metallic contaminants or any combination thereof. The munitions contaminants can also include propellant contaminants, such as perchlorate ($ClO_4$). The contaminated aqueous flow can therefore include water and various energetic material contaminants, metallic contaminants, propellant contaminants or combination thereof.

In some implementations, the systems described herein for treating the contaminated water can include more than one adsorption layer which includes bone char particulates, titanium dioxide particulates and/or aluminum oxide particulates. For example, a first contaminated aqueous flow obtained by allowing water to fall on the exploded munitions debris can be contacted with a first adsorption layer to produce a first treated aqueous flow, while a second contaminated aqueous flow obtained by letting water fall on the burned munitions debris can be contacted with a second adsorption layer to produce a second treated aqueous flow. For example, the first adsorption layer can be buried in the ground, while the second adsorption layer can be provided ex situ (e.g., in a water treatment unit). The first treated aqueous flow can then be allowed to percolate down through the earth so as to reach groundwater (or alternatively, surface water). The second treated aqueous flow can also be supplied to a water disposal site. For example, the second treated aqeuous flow can be supplied to the surface water (e.g., a lake, a ditch, a creek, a river, an ocean), onto the ground to percolate through the earth towards groundwater, towards a sewage system, towards a pluvial system, or towards a water treatment plant, etc.

Referring now to FIG. 1, in one implementation, there is provided a system (10) for treating a contaminated aqueous flow (12). The system (10) includes an adsorption layer (16) which includes bone char particulates, titanium dioxide particulates and/or aluminum oxide particulates (18) which promotes adsorption of the contaminants upon contact of the contaminated aqueous flow (12) and the adsorption layer (16). The adsorption layer (16) can be made exclusively of bone char particulates (18), titanium dioxide particulates and/or aluminum oxide particulates, or can include bone char particulates, titanium dioxide particulates and/or aluminum oxide particulates (18), and other particulates. A treated aqueous flow (20), which is depleted in the contaminants, is produced. The adsorption layer (16) is therefore permeable to water, but adsorbs the munitions contaminants, at least in part, leaving the treated aqueous flow (20) depleted in the munitions contaminants.

Figure 2:
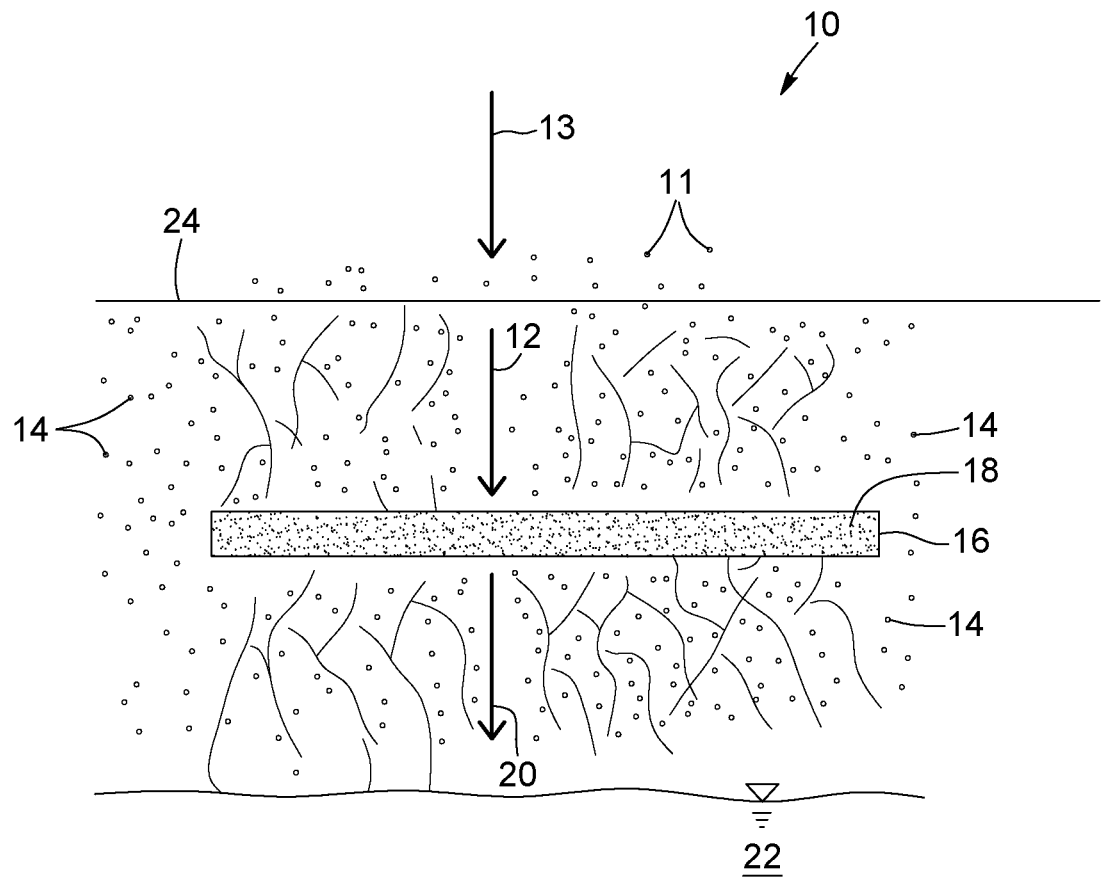
FIG. 2 schematically illustrates a system for treating the contaminated aqueous flow in accordance with another implementation.

Referring to FIG. 2, in one implementation, the adsorption layer (16) can be buried in the granulate particles (14). For example, the adsorption layer (16) can be buried in the ground so that the contaminated aqueous flow (12) (i.e., water (13)+munitions contaminants (11)) can percolate down into the granulate particles (14) forming the earth (i.e., contaminated water (12) can naturally flow through the granulate particles (14)), towards the adsorption layer (16). The treated aqueous flow (20) produced can further percolate down, in the granulate particles (14) with the interstitial water, for example, towards the phreatic table (22) or surface water (i.e., any source of water such as a river, a lake, a pond, or the ocean, etc.). Indeed, allowing a flow of water (13) to fall on the debris produces the contaminated aqueous flow (12), which can percolate down into the granulate particles (14), and towards the adsorption layer (16) for water treatment.

Figure 3:
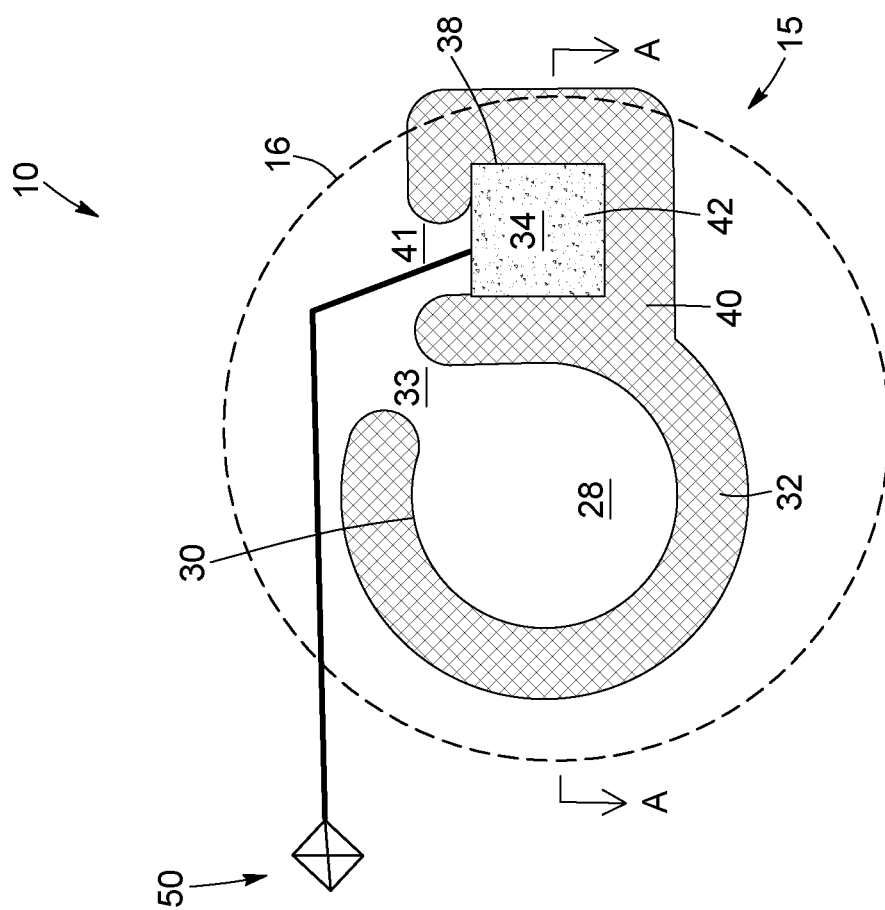
FIG. 3 is a top plan view of a system for treating the contaminated aqueous flow in accordance with a further implementation.
Figure 4:
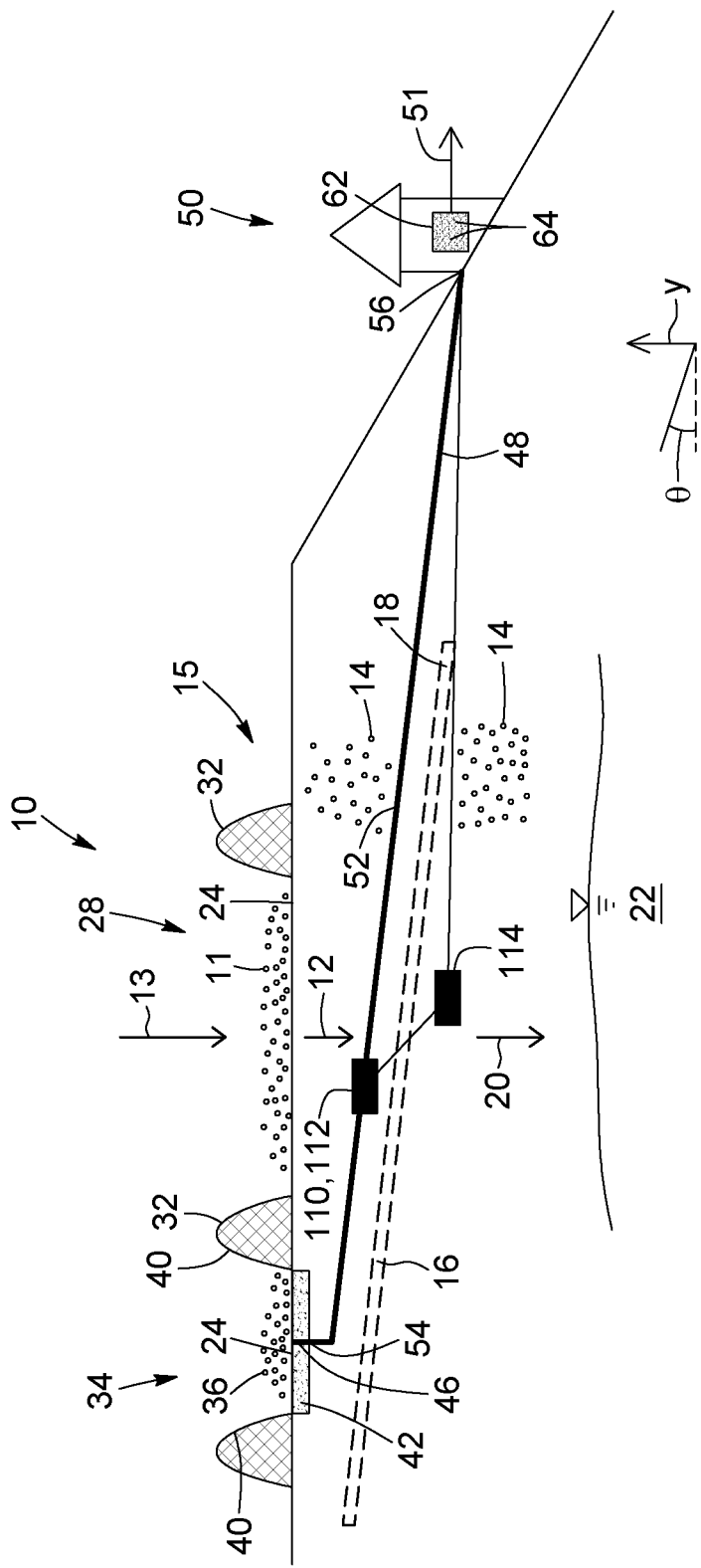
FIG. 4 is an elevation view of the system of FIG. 3.

Referring now to FIGS. 3 and 4, in one implementation, the system (10) allows for preventing contamination of groundwater (22) that is located underneath, or hydraulically below, a military training range (15), destruction site or munition production site. The military training range (15) includes a destruction area (28), where munitions can be provided on a munitions supporting surface (24) and safely exploded, and a burning area (34), where munitions can be provided on the munitions supporting surface (24) and safely burned. For example, water bags can be used for noise reduction and confinement of the munitions during the destruction activities. As shown, both the destruction area (28) and the burning area (34) can be located on top of a hill formed of the granulate particles (14) which can include, for example, sand, rocks, etc. The adsorption layer (16) can be buried in the granulate particles (14), underneath the destruction and burning areas (28, 34). It is noted that the adsorption layer (16) can be oriented vertically, instead of horizontally. The system (10) can thus be tailored for any type of application, by providing the adsorption layer (16) either in an in situ horizontal or vertical configuration.

Figure 15:
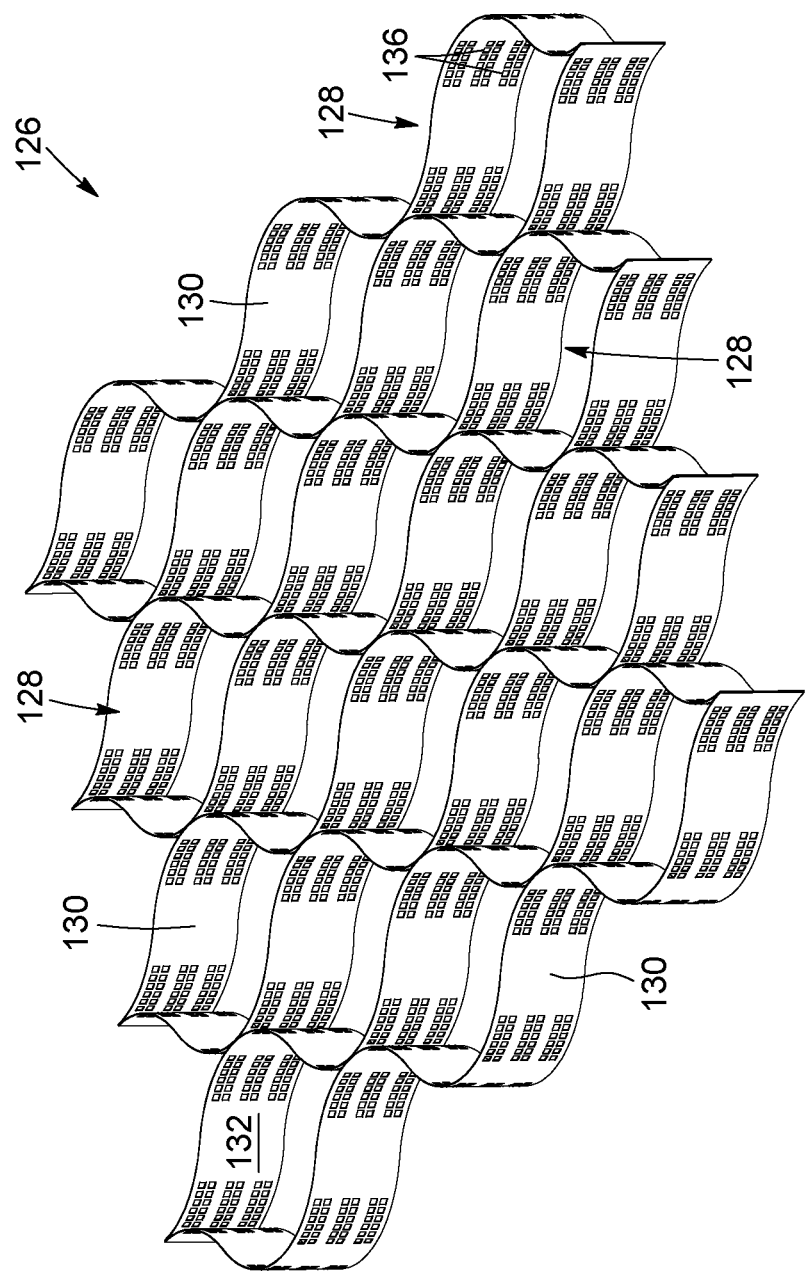
FIG. 15 is a top perspective view of a support structure which confines the bone char particulates in accordance with a further implementation.

In one scenario, the adsorption layer (16) can be buried in the ground, at an existing military training range. In another scenario, a new training range can be constructed. For example, a first layer which includes granulate particles (14) can be provided on the ground. Bone char particulates, titanium dioxide particulates and/or aluminum oxide particulates (18) can then be provided on the first layer of granulate particles (14), while a second layer of granulate particles (14) can be provided on the bone char particulates, titanium dioxide particulates and/or aluminum oxide particulates (18) to cover the same. In both scenarios, before covering up the bone char particulates, titanium dioxide particulates and/or aluminum oxide particulates (18) with the granulate particles (14), the bone char particulates, titanium dioxide particulates and/or aluminum oxide particulates (18) can be levelled so that the adsorption layer (16) can have a thickness which is substantially constant throughout the surface area of the adsorption layer (16). As shown in FIG. 15, in one implementation, the adsorption layer (16) can further include a support structure (126) for containing the bone char particulates, titanium dioxide particulates and/or aluminum oxide particulates (18) therein. The support structure (126) can include a plurality of compartments (128). Each compartment (128) can have sidewalls (130) which define an opened top (132) and an opened bottom (not shown). Spaced apart apertures (136) can optionally be formed in the sidewalls (130) so as to allow the bone char particulates, titanium dioxide particulates and/or aluminum oxide particulates (18) to travel from one compartment (128) to another. The support structure (126) can help in levelling the particulates (18) so the adsorption layer (16) can have a substantially constant thickness. In one scenario, the support structure (126) can be used for levelling thinner adsorption layers (16) of particulates (18), but not necessarily for levelling thicker layers (e.g., layers above 10 centimeters). In some implementations, layers adjacent to the adsorption layer (16) can include cleaned granulate particles, such as cleaned sand particles, so as to protect the adsorption layer (16) from potential contaminants which can be present in the ground.

Alternatively, the thickness of the adsorption layer (16) can be greater in some sections of the adsorption layer (16) that have to deal with higher flow rates of the contaminated aqueous flow (12) for example, or that have to deal with a contaminated aqueous stream (12) of a notable munitions contaminants content. For example, the thickness of the adsorption layer (16) can be greater underneath the destruction area (28), and can decrease radially therefrom. The thickness of the layer (16) can thus be adjusted, for example, depending on the flow rate of the contaminated water (12) (e.g., the flow rate of the precipitation water (13)) and/or on the munitions contaminants content of the contaminated aqueous stream (12).

The granulate particles (14) can include sand and rocks, as mentioned above, but also particles such as activated carbon, peat moss, coconut coir, any suitable granulate particles which can support and/or cover the bone char particulates, titanium dioxide particulates and/or aluminum oxide particulates (18), or any combination thereof, as long as it is fine enough to let the contaminated water (12) and the treated water (20) to flow or percolate downwardly through the earth. In one scenario, only bone char particulates (18) can be used and the granulometry of the bone char particulates (18) can be different than the granulometry of the granulate particles (14) which support or cover the bone char particulates (18), so as to prevent the bone char particulates (18) from mixing with the granulate particles (14). In other words, the bone char granulometry and the surrounding granulate particles granulometry can be compatible to avoid migration of the bone char particulates (18) into the granulate particles (14) or vice versa. For example, the granulometry of the bone char particulates (18) can be between about 0.1 mm and about 3.0 mm, or between about 0.5 mm and about 2.0 mm, as long as the grain size of the bone char particulates (18) and the grain size of the granulate particles (14) allow the contaminated water (12) to flow therethrough. For example, the granulometry of the granulate particles (14) can be such as to allow the layer of granulate particles (14) to be permeable to a contaminated water stream having particles smaller than 3 mm, for example.

According to the implementation of FIGS. 3 and 4, the adsorption layer (16) is buried in the granulate particles (14) in vertical alignment with both the destruction area (28) and the burning area (34) and presents a downward slope. Indeed, the adsorption layer (16) is buried in the granulate particles (14) at an angle @ relative to a vertical axis (Y).

As mentioned above, destroying the munitions by exploding and/or burning them leaves exploded munitions debris and/or burned munitions debris, which include the munitions contaminants (11, 36), on the ground. Allowing the flow of water (13) to fall on the exploded munitions debris produces a contaminated aqueous flow (12), including water and the munitions contaminants (11), which can percolate down through the granulate particles (14) (i.e., through the earth), towards the adsorption layer (16). The treated aqueous flow (20) can further percolate down with the interstitial water. Additionally, allowing the flow of water (13) to fall on the burned munitions debris produces a contaminated aqueous flow (48). The contaminated aqueous flow (48) produced, instead of naturally percolating down through the granulate particles (14) towards the adsorption layer (16), can be supplied to a water treatment unit (50), which can be located down the hill, to contact an adsorption layer or material (62) which includes bone char particulates, titanium dioxide particulates and/or aluminum oxide particulates (64), or other water treatment particulates (or a mixture thereof) as it will be described in more details below. The treated aqueous flow (51) produced is depleted in the munitions contaminants (36) and can be subjected to the water disposal site. The content of munitions contaminants (36) present in the contaminated aqueous flow (48) can be higher than the content of munitions contaminants (11) present in the contaminated aqueous flow (12) or vice versa.

Optionally, the treated aqueous flow (51), before being released, can be supplied to additional water treatments (e.g., sedimentation, decantation, filtration, ozone, chemical treatments, etc.). Alternatively, the contaminated aqueous flow (48) can be supplied first to such water treatments, and subsequently, be brought into contact with the adsorption layer (62).

Figure 13:
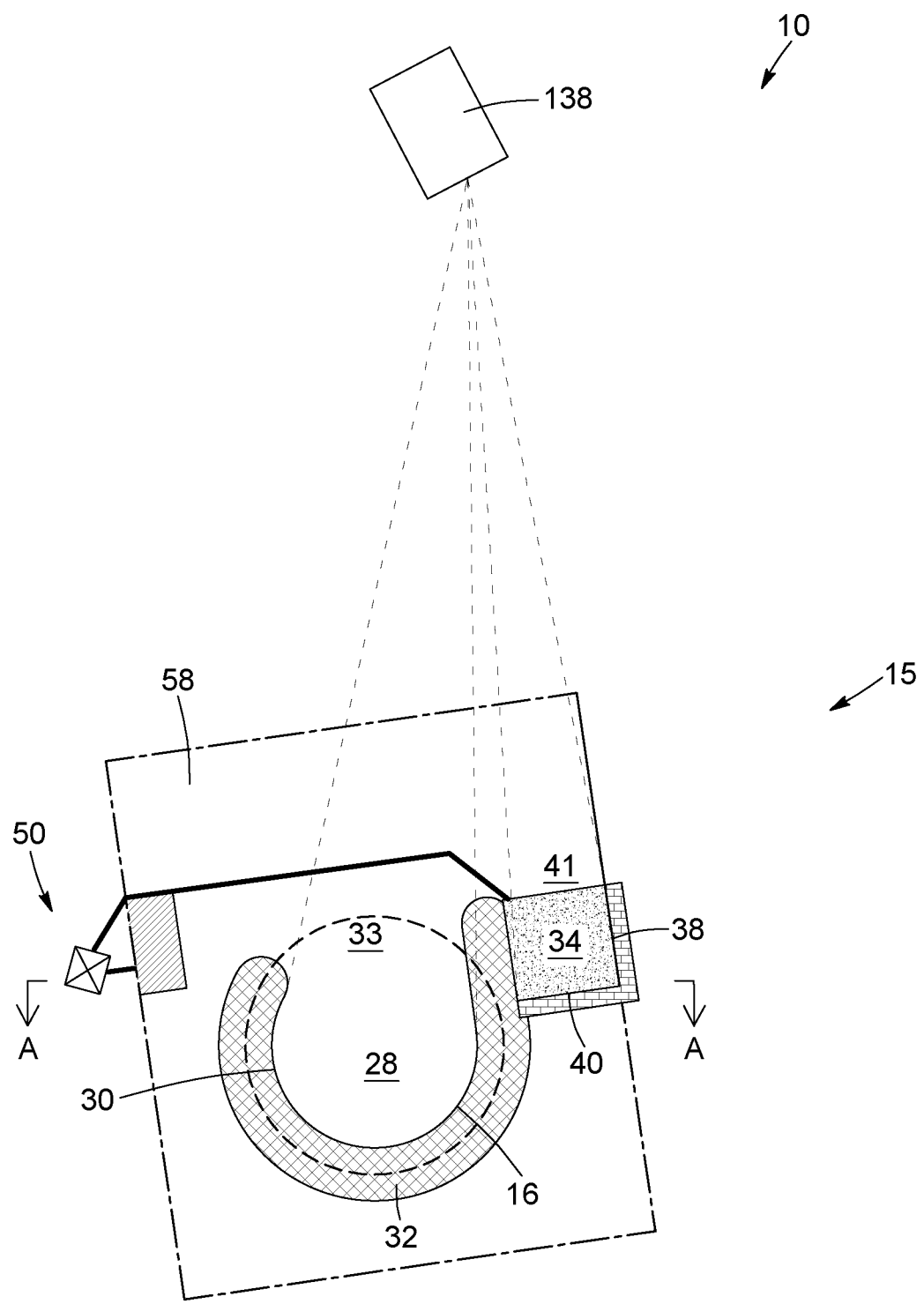
FIG. 13 is a top plan view of a system for treating the contaminated aqueous flow in accordance with another implementation.
Figure 14:
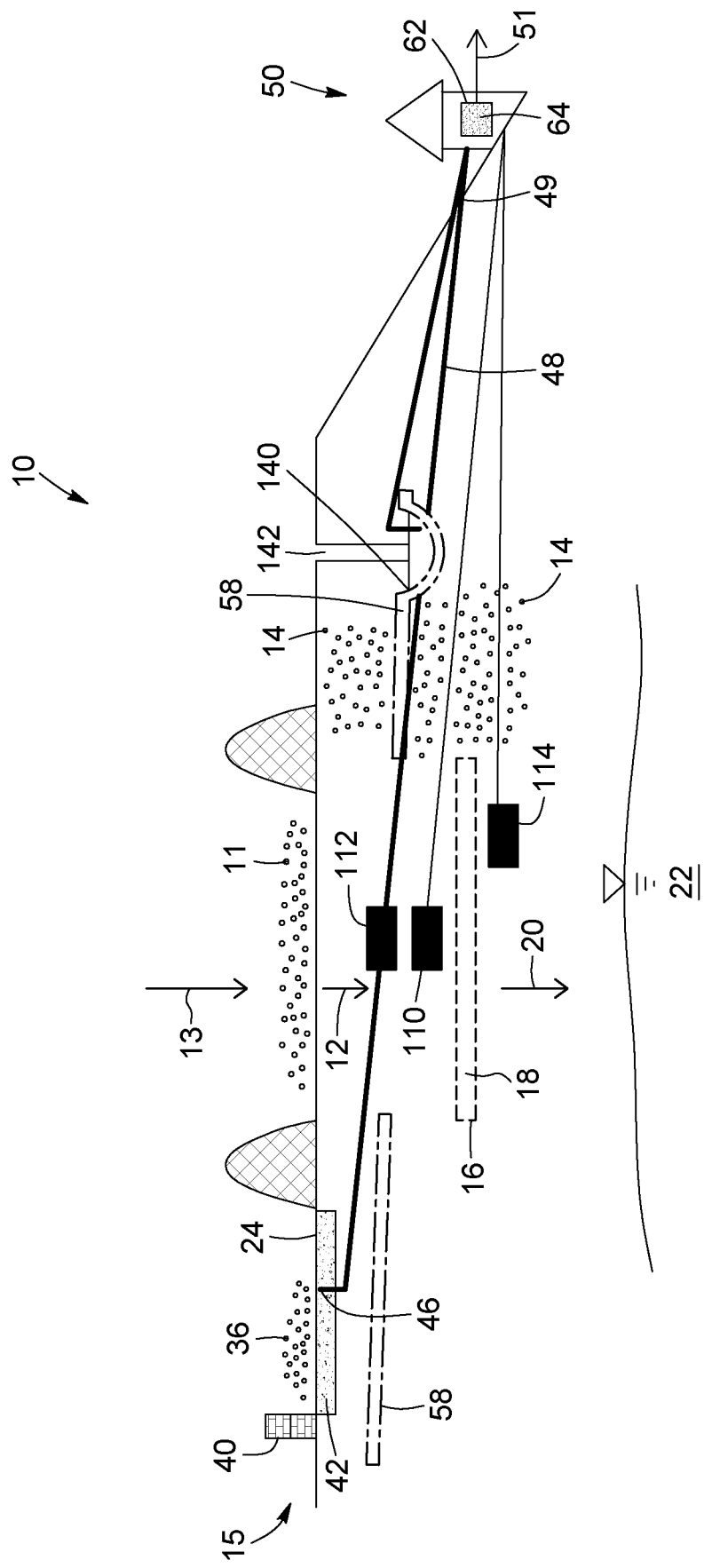
FIG. 14 is an elevation view of the system of FIG. 13.

Still referring to the implementation of FIGS. 3 and 4, the destruction area (28) can define a destruction periphery (30), as best shown in FIG. 3. The destruction area (28) can include a destruction protective wall (32) (e.g., merlons), which upwardly extends from a portion of the destruction periphery (20). An opening (33) in the destruction protective wall (32) can increase visibility of the destruction area (28) during the destruction activities, from an operator's location (138) for example (FIG. 13). The burning area (34) can be located adjacent to the destruction area (28) and can define a burning periphery (38), as best shown in FIG. 3. The burning area (34) can include a burning protective wall (40) (e.g., merlons), which upwardly extends from a portion of the burning periphery (38). An opening (41) in the burning protective wall (40) can increase visibility of the burning area (34) during the burning activities, from the operator's location (138) for example (FIG. 13). The destruction and burning protective walls (32, 40) can be made of a material similar to the granulate particles (14). For example, the destruction protective wall (32) and/or the burning protective wall (40) can be made of sand, gravel, rocks, and the like. Plants and/or trees can also be planted on the external surfaces of the walls (32, 40) to prevent erosion, as long as the munitions supporting surface (24) of the destruction area (28), which is delimited by the destruction periphery (30) can allow the contaminated aqueous flow (12) to percolate through the earth. Alternatively, walls made of a rigid material, such as concrete, can delimit the burning area (34), so munitions can be safely burned to produce the burned munitions debris (FIGS. 13 and 14). It is noted that in other scenarios, the destruction area (28) can be located remotely from the burning area (34), or burning activities can occur in the destruction area (28) or vice versa. One of the purposes of these walls (32, 40) can be to prevent the debris to travel out of the destruction and burning areas (28, 34). Keeping them in these areas (28, 34) can force the munitions contaminants (11, 36) to contact the adsorption layers (16, 62), instead of percolating through the earth in periphery of the system (10), with the groundwater or interstitial water.

Referring more particularly to FIG. 4, the burning area (34) further includes a floor (42), which is configured to receive and support the munitions to be burned. The floor (42) can be made of a material which is substantially impervious to the flow of contaminated water (48). For example, the floor (42) and the walls (40), which extend upwardly from the floor (42), can be made of concrete or other similar material. The floor (42) can include an outlet (46) in a lower section thereof for expelling the contaminated water (48) from the burning area (34). The system (10) can further include a pipe (52) having a first end (54) and a second end (56), which can be found below the first end (54). The first end (54) can be in fluid communication with the outlet (46) of the floor (42) so that the contaminated aqueous flow (48) can flow therethrough and towards the adsorption layer (16), for example, being located in the water treatment unit (50). It is however noted that, in another scenario, the floor (42) can allow the contaminated aqueous flow (48) to percolate through the earth towards the adsorption layer (16) so that both the contaminated water streams (12, 48) can be treated by the adsorption layer (16).

Referring back to FIGS. 3 and 4, the water treatment unit (50) can be in fluid communication with the burning area (34), and more particularly with the second end (56) of the pipe (52). The water treatment unit (50) can be configured to receive and treat the contaminated aqueous flow (48) obtained by the burning activities. As it will be described in more details below, the water treatment unit (50) can include an adsorption layer (62) to promote adsorption of the munitions contaminants (36), which are present in the contaminated aqueous flow (48), upon contact of the contaminated aqueous flow (48) and the bone char particulates, titanium dioxide particulates and/or aluminum oxide particulates (64) to produce the treated aqueous flow (51) which is depleted in the munitions contaminants (36). The contaminated aqueous stream (48) can thus naturally flow, by gravity for example, from the burning area (34), which can be located on the hill, towards the water treatment unit (50), which can be located substantially below the outlet (46) of the floor (42) (i.e., down the hill).

Providing the system (10) with a first adsorption layer (16), being buried in the ground for example, to treat the contaminated aqueous flow (12) obtained from the destruction activities and with a second ex situ adsorption layer (62), within the water treatment unit (50) for example, to treat the contaminated aqueous flow (48) obtained from the burning activities can allow to contact the contaminated aqueous streams (12, 48) with different bone char particulates, titanium dioxide particulates and/or aluminum oxide particulates (18, 64) (or different adsorption layers (16, 62)) which are specific to the munitions contaminants, the munitions contaminants content of the contaminated aqueous streams (12, 48) to be treated and/or the flow rates of the contaminated stream (12, 48). For example, the thickness of the adsorption layer (16) can be greater than the thickness of the adsorption layer (62) or vice versa.

It is further noted that the contaminated aqueous flow (12) has to contact the bone char particulates, titanium dioxide particulates and/or aluminum oxide particulates (18) for a contact time which is sufficient to adsorb the munitions contaminants (11) which are present in the contaminated water stream (12), at least in part. Similarly, the contaminated aqueous flow (48) has to contact the bone char particulates, titanium dioxide particulates and/or aluminum oxide particulates (64) for a contact time which is sufficient to adsorb the munitions contaminants (36) which are present in the contaminated water stream (48), at least in part. For example, depending on the nature of the munitions contaminants (11, 36), but also on the munitions contaminants contents of the contaminated water streams (12, 48), the contact time can be between about 10 minutes and 10 hours. In one scenario, the contaminated aqueous flow (12) can have a munitions contaminants content above a threshold so as to safely mix with the groundwater, with minimized impacts of the munitions contaminants (11) on the environment (aquatic life, drinking water, etc.), while the treated aqueous flow (20), which is depleted in the munitions contaminants (11), can have a munitions contaminants content below a threshold so as to safely mix with the groundwater, with minimized impacts of the munitions contaminants (11) on the environment (aquatic life, drinking water, etc.) In other words, the contaminated aqueous streams (12, 48) can have a munitions contaminants content above the one provided in the drinking water and aquatic life guidelines, while the treated aqueous streams (20, 51) can have a munitions contaminants content equal or below the one provided in the drinking water and aquatic life guidelines. For example, the contaminated aqueous flow can have a munitions contaminants content up to the maximal aqueous solubility of the energetic material contaminants, metallic contaminants or propellant contaminants, while the treated aqueous flow can have a munitions contaminants content, for example, below 0.09 µg-Cd/L, below 2 µg-Cu/L, below 1 µg-Pb/L, below 6 µg-Sb/L, below 30 µg-Zn/L, below 3 µg-ClO$_4$/L, below 9 µg-RDX/L, below 470 µg-HMX/L, or below 120 µg-TNT/L, depending on the nature of the contaminants.

The flow rate of the contaminated aqueous flow (12) and/or the flow rate of the contaminated aqueous flow (48) can depend on the flow rates of the precipitations (snow, rain, etc.). Indeed, the munitions contaminants content of the contaminated aqueous flow (12), the munitions contaminants content of the treated aqueous flow (20), the flow rate of the contaminated aqueous flow (12), the flow rate of the treated aqueous flow (51), the munitions contaminants content of the contaminated aqueous flow (48), the munitions contaminants content of the treated aqueous flow (51), the flow rate of the contaminated aqueous flow (48) and the flow rate of the treated aqueous flow (51) can depend on the flow rate of water (13) falling on the debris. As the flow of water (13) falling on the munitions contaminants (11, 36) can be precipitation water, such as rain, melted snow, etc., the flow rates of the contaminated aqueous streams (12, 48) and the flow rates of the treated aqueous streams (20, 51) can depend on the weather forecast.

It should be noted that the adsorption layer (16) can be buried, for example, in the granulate particles at a depth of about 2 meters below the destruction area (28) to ensure its integrity during the destruction activities, and at a depth of about 10 meters from the supporting surface (24), in other scenarios or areas. In other words, the adsorption layer (16) can be buried in the granulate particles (14) sufficiently deep so as to be prevented from being damaged by the training activities (e.g., about 30 centimeters), as long as it is located in the unsaturated zone of the earth (i.e., above the phreatic table). Indeed, in one scenario, the adsorption layer (16) can be buried between the munitions supporting surface (24) and groundwater (22) (i.e., the phreatic table), so as to allow the contaminated aqueous flow (12) to contact the adsorption layer (16) and be treated by the bone char particulates (18) prior it reaches groundwater (22). It can be buried deep enough to keep large fragments from disturbing the treatment layer, and high enough to stay away from groundwater table. Alternatively, the adsorption layer (16) can be buried into the saturated zone to avoid dissolved munitions contaminants to reach the surface of a water body. It is also noted that the adsorption layer (16) can be buried below the level at which the ground freezes. It is further noted that the adsorption layer (16) of and/or the adsorption layer (62) can have a thickness of between about few centimeters and about 2 meters. In other words, the adsorption layers (16, 62) can have a thickness that will provide to contaminated aqueous streams (12, 48) to contact with the bone char particulates, titanium dioxide particulates and/or aluminum oxide particulates for a contact time sufficient to produce the treated aqueous flows (20, 51) with munitions contaminants contents below suitable thresholds, as defined above. The thickness of the adsorption layers (16, 62) can thus be relative to the amount of infiltration water (13) and the concentration of the munitions contaminants of concern which are present in the contaminated water streams (12, 48).

Figure 7:
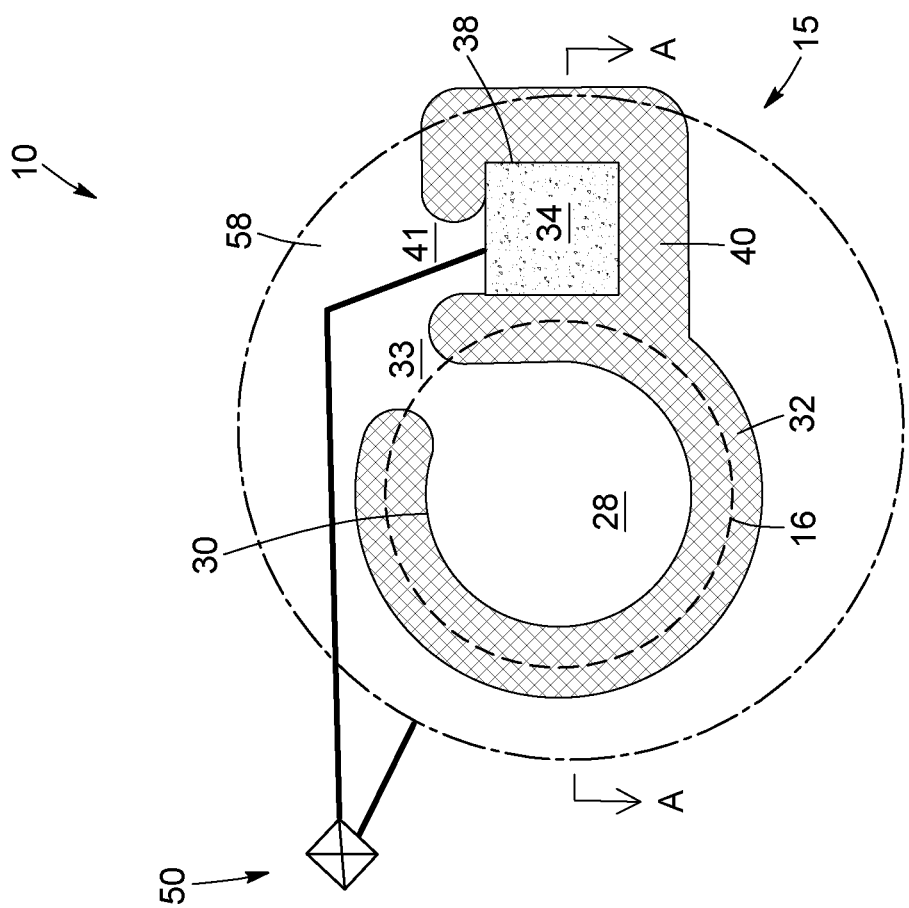
FIG. 7 is a top plan view of a system for treating the contaminated aqueous flow in accordance with another implementation.

In some implementations, the adsorption layer (16) can have a surface area of between about 10 m$^2$ and about 10,000 m$^2$. In one scenario, the surface area of the adsorption layer (16) can be equal or greater than the surface area of the destruction area (28), equal or greater than the surface area of the burning area (34), or equal or greater than the surface area of both the destruction and burning areas (28, 34). The surface area of the adsorption layer (16) can however be smaller. The layer (16) can for example by provided in a box, barrel or a container, as it will be exemplified below. In one scenario, the surface area of the adsorption layer (16) can extend past the destruction periphery (30), so its periphery can be in vertical alignment with the center of the destruction protective wall (32) or merlons (FIG. 7).

In some implementations, the bone char particulates (18, 64) can have a relative density of between about 650 kg/m$^3$ and about 850 kg/m$^3$. In some implementations, the bone char particulates (18, 64) can have a carbon content of between about 7% and about 13%. In some implementations, the bone char particulates (18, 64) can have a tricalcium phosphate content of between about 60% and about 85%.

Figure 5:
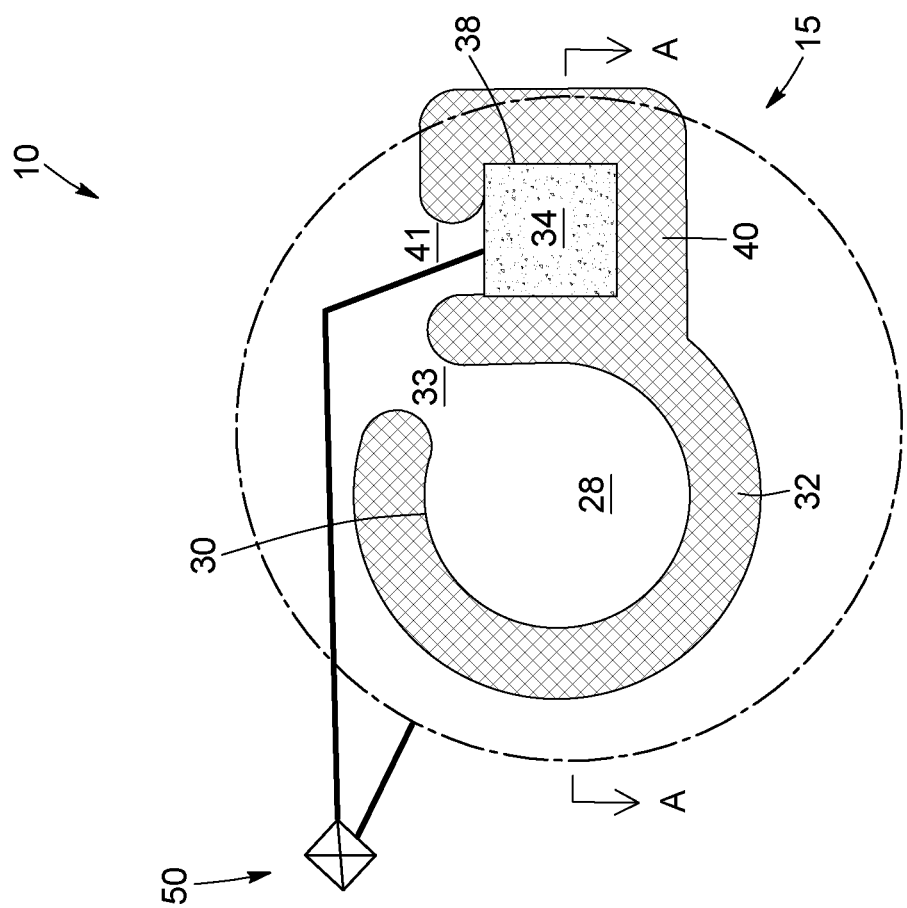
FIG. 5 is a top plan view of a system for treating the contaminated aqueous flow in accordance with yet another implementation.
Figure 6:
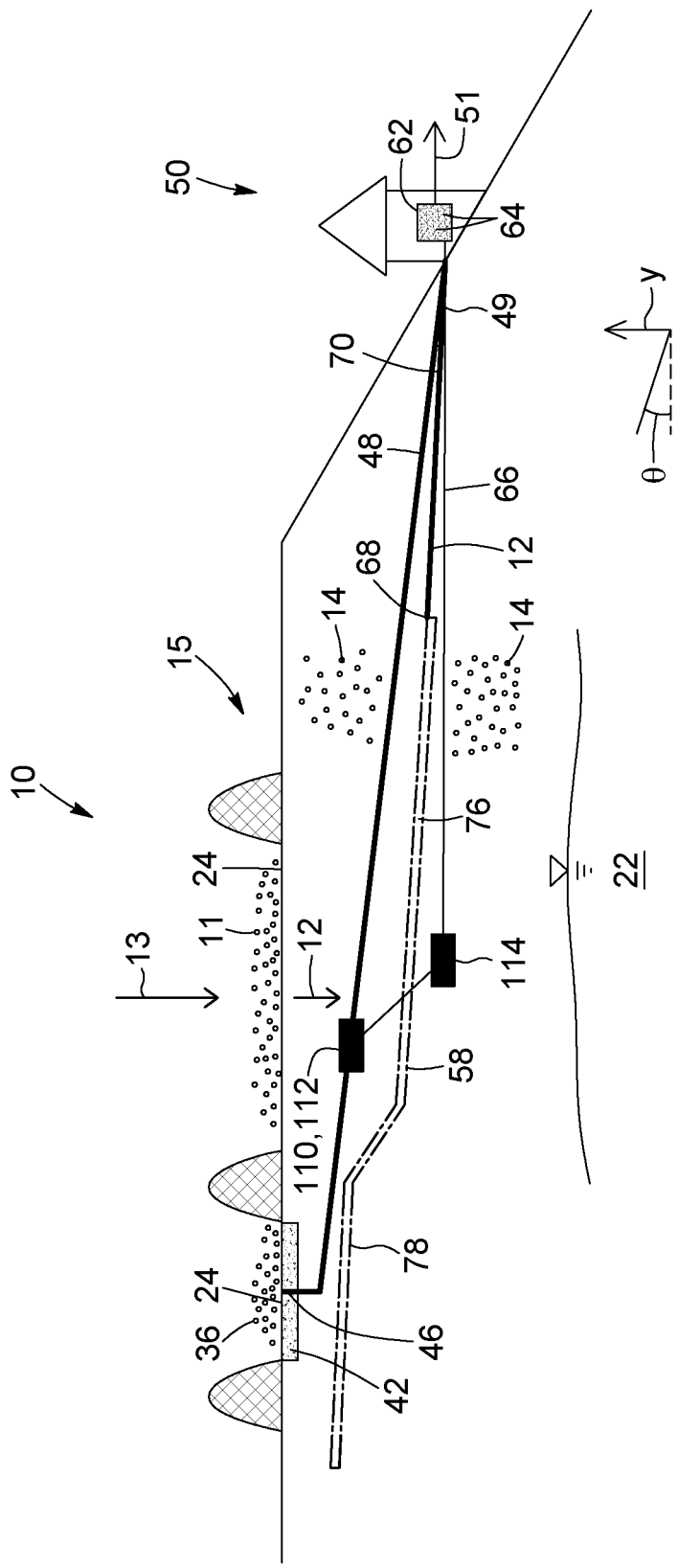
FIG. 6 is an elevation view of the system of FIG. 5.

Referring now more particularly to FIGS. 5 and 6, in one implementation, instead of being provided with an adsorption layer (16) being buried in the granulate particles (14), the system (10) can include an impermeable membrane (58), which can be buried in the granulate particles (14). The impermeable membrane (58) can be impervious to the contaminated aqueous flow (12) and can be configured to collect the contaminated aqueous flow (12) which percolates through the earth.

The contaminated aqueous flow (12) produced, instead of naturally percolating down through the granulate particles (14) with interstitial water for example, once it has contacted the adsorption layer (16), is contacted with the ex situ adsorption layer (62), for example, being provided in the water treatment unit (50) located down the hill, to contact the bone char particulates, titanium dioxide particulates and/or aluminum oxide particulates (64). In one scenario, the contaminated aqueous flow (12) and the contaminated aqueous flow (48) can be mixed to obtain a combined contaminated aqueous flow (49) which can contact the adsorption layer (62) to produce the treated water stream (51). Alternatively, the contaminated aqueous flow (12) can contact a first adsorption layer to produce a first treated water stream and the contaminated aqueous flow (48) can separately contact a second adsorption layer to produce a second distinct treated water stream (not shown). Still referring to the implementation of FIGS. 5 and 6, the treated aqueous flow (51) produced is depleted in the munitions contaminants (11, 36) and can be subjected to the water disposal site.

As shown in FIGS. 5 and 6, the system (10) can further include a pipe (66) having a first end (68) and a second end (70), which can be located below the first end (68). The first end (68) can be in fluid communication with the impermeable membrane (58) so that the contaminated aqueous flow (12) can flow therethrough and towards the adsorption layer (62) of the water treatment unit (50) for example. In one scenario, the impermeable membrane (58) can define a downward slope and include an outlet formed in a lower section thereof so that the first end (68) of the pipe (66) can be coupled therewith. The contaminated aqueous stream (12) can thus flow through the outlet formed in the impermeable membrane (58) and through the pipe (66) towards the adsorption layer (62) or other treatment unit. Alternatively, so as to avoid breaking the impermeable membrane (58) prematurely, a pump can be used to fill the pipe (66) with the contaminated water (12) that has been collected by the impermeable membrane (58) (FIGS. 13 and 14).

Thus, the water treatment unit (50) can be in fluid communication with the impermeable membrane (58), and more particularly with the second end (70) of the pipe (66).

According to the implementation of FIGS. 5 and 6, the water treatment unit (50) can be configured to receive and treat the contaminated aqueous flow (48) obtained by the burning activities, but also to receive and treat the contaminated aqueous flow (12) obtained by the destruction activities. The contaminated water (12) can thus naturally flow by gravity, once it has contacted the impermeable membrane (58), from highest levels of the impermeable membrane (58) towards lowest levels of the impermeable membrane (58) for example, and then through the pipe (66) towards the water treatment unit (50), being located substantially below the first end (68) of the pipe (66) (i.e., down the hill). Alternatively, instead of using gravity to supply the contaminated water stream (12) to the water treatment unit (50) being positioned down the hill, the water treatment unit (50) can be located at the same level of the destruction and/or burning areas (28, 36) (or above), and the collected contaminated water can be pumped upwardly from the impermeable membrane (58) towards the water treatment unit (50) (not shown).

Burying an impermeable membrane (58) instead of an adsorption layer, such as the adsorption layer (16), to treat the contaminated aqueous flow (12) obtained from the destruction activities can allow to contact the streams (12, 48) ex situ of the granulate particles (14), in the water treatment unit (50). According to this scenario, if for example the munitions contaminants content of the treated water stream (51) was not below the recommended threshold, the treated water stream (51) can be supplied to subsequent water treatments (i.e., additional bone char adsorption treatment(s), ozone, chemical treatments, etc.). This step could be impossible when contacting contaminated water (12) with a buried adsorption layer, as the treated water percolates directly through the earth and no additional treatments can be provided passed the adsorption layer (16).

It should be noted that the impermeable membrane (58) can be buried in the granulate particles (14) at a depth of between about 30 centimeters and about 10 meters from the munitions supporting surface (24). The impermeable membrane (58) can be buried in the granulate particles (14) sufficiently deep so as to be protected from the destruction activities, as long as it is located in the unsaturated zone of the earth (i.e., above the phreatic table). Indeed, in one scenario, the impermeable membrane (58) can be buried between the munitions supporting surface (24) and groundwater (22) (i.e., the phreatic table), so as to allow the contaminated aqueous flow (12) to be collected by the impermeable membrane (58) prior it reaches the saturated zone of the earth. It is also noted that the impermeable membrane (58) can be buried below the level at which the ground freezes.

Figure 9:
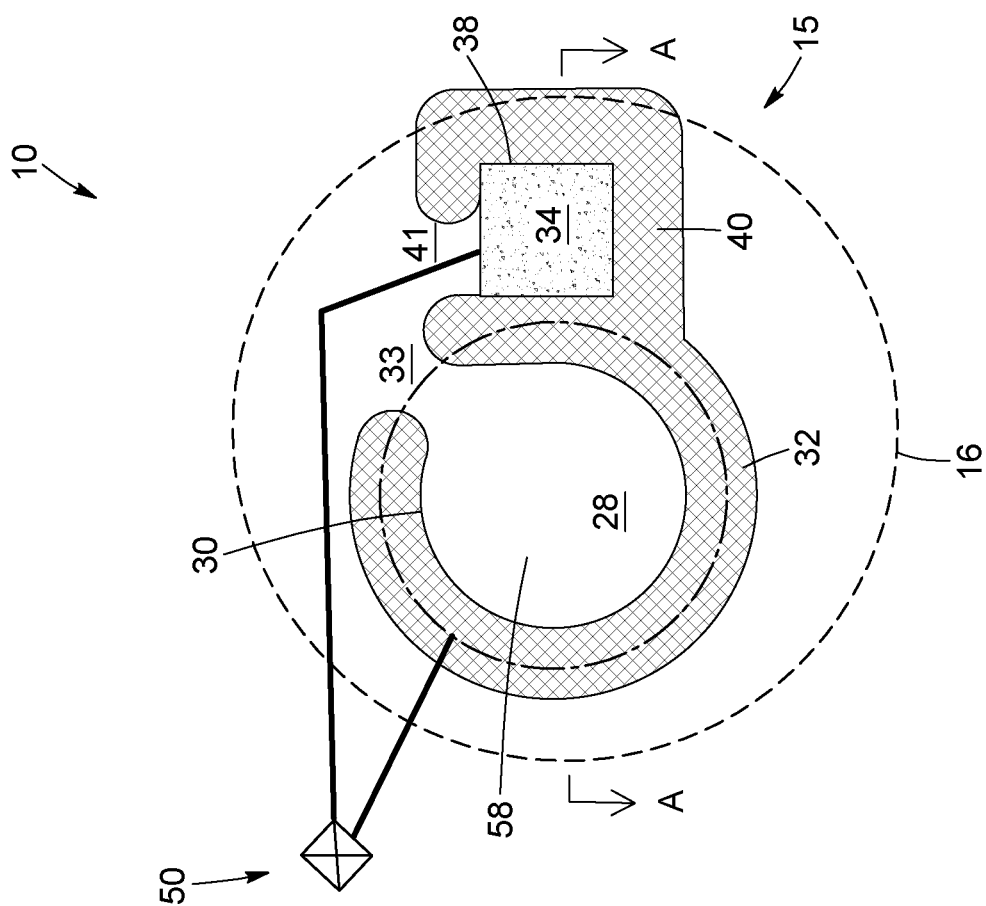
FIG. 9 is a top plan view of a system for treating the contaminated aqueous flow in accordance with a further implementation.

In some implementations, the impermeable membrane (58) can have a surface area of between about 10 m² and about 10,000 m². In one scenario, the surface area of the impermeable membrane (58) can be equal or greater than the surface area of the destruction area (28), equal or greater than the surface area of the burning area (34), or equal and greater than the surface area of both the destruction and burning areas (28, 34). In one scenario, the surface area of the impermeable layer (58) can extend past the burning periphery (38), so its periphery can be in vertical alignment with the center of the destruction protective wall (32) or merlons (FIG. 9).

It is also noted that the impermeable membrane (58) can include a first section (76) in vertical alignment with the destruction area (28), and a second section (78) in vertical alignment with the burning area (34). In one scenario, the surface area of the first section (76) of the impermeable membrane (58) can be equal or greater than the surface area of the destruction area (28), while the surface area of the second section (78) of the impermeable membrane (58) can be equal or greater than the surface area of the burning area (34). As shown in the implementation of FIGS. 5 and 6, the first section (76) of the impermeable membrane (58) can be buried deeper in the granulate particles (14) than the second section (78) of the impermeable membrane (58). Even though FIGS. 5 and 6 illustrate the first and second sections (76, 78) of the impermeable membrane (58) as presenting similar slopes, it is noted that the first section (76) can be oriented so as to have a first angle relative to the vertical axis (Y), while the second section (78) can be oriented so as to have a second angle relative to the vertical axis (Y), being different than the first angle. For example, the first section (76) can have a slope which is steeper than the slope of the second section (78) or vice versa.

It is noted that the impermeable membrane (58) can be made of any material, as long as the material involved is impervious to the contaminated aqueous flow (12 and/or 48), so the contaminated water stream (12 and/or 48) can be collected instead of percolating through the earth. In one scenario, the impermeable membrane (58) can be made of polyethylene, such as high-density polyethylene (HDPE). In another scenario, the impermeable membrane (58) can be made of bentonite. In a further scenario, the impermeable membrane (58) can include a first layer made of bentonite and a second layer made of HDPE, which is superposed to the first layer made of bentonite. The impermeable membrane (58) must be sufficiently malleable to allow good installation in the granulate particles (14), but at the same time, sufficiently rigid to avoid its breakage and perforation. In a different scenario (not illustrated), the impermeable membrane (58) which is buried in the granulate particles (14) can even be replaced by a slab of concrete with an outlet formed in a lower section thereof so that the first end (68) of the pipe (66) can be coupled therewith, as long as it allows to collect the contaminated water (12 and/or 48) so it can be supplied towards the adsorption layer (62) of the water treatment unit (50).

It is further noted that, even though the adsorption layer (16) of bone char particulates, titanium dioxide particulates and/or aluminum oxide particulates (18) (FIGS. 3 and 4) and the impermeable layer (58) (FIGS. 5 and 6) are illustrated as having a substantially circular surface area, the adsorption layer (16) of particulates (18) and/or the impermeable layer (58) can have a surface area of any shape, size and/or configuration, as long as the adsorption layer (18) can adsorb the munitions contaminants (11) which are present in the contaminated aqueous flow (12) (and optionally the munitions contaminants (36) which are present in the contaminated aqueous flow (48)), at least in part (FIGS. 3 and 4), and the impermeable membrane (58) can collect the contaminated aqueous stream (12) (and optionally the contaminated aqueous stream (48)), at least in part, so it can be supplied to the water treatment unit (50) (FIGS. 5 and 6).

Figure 8:
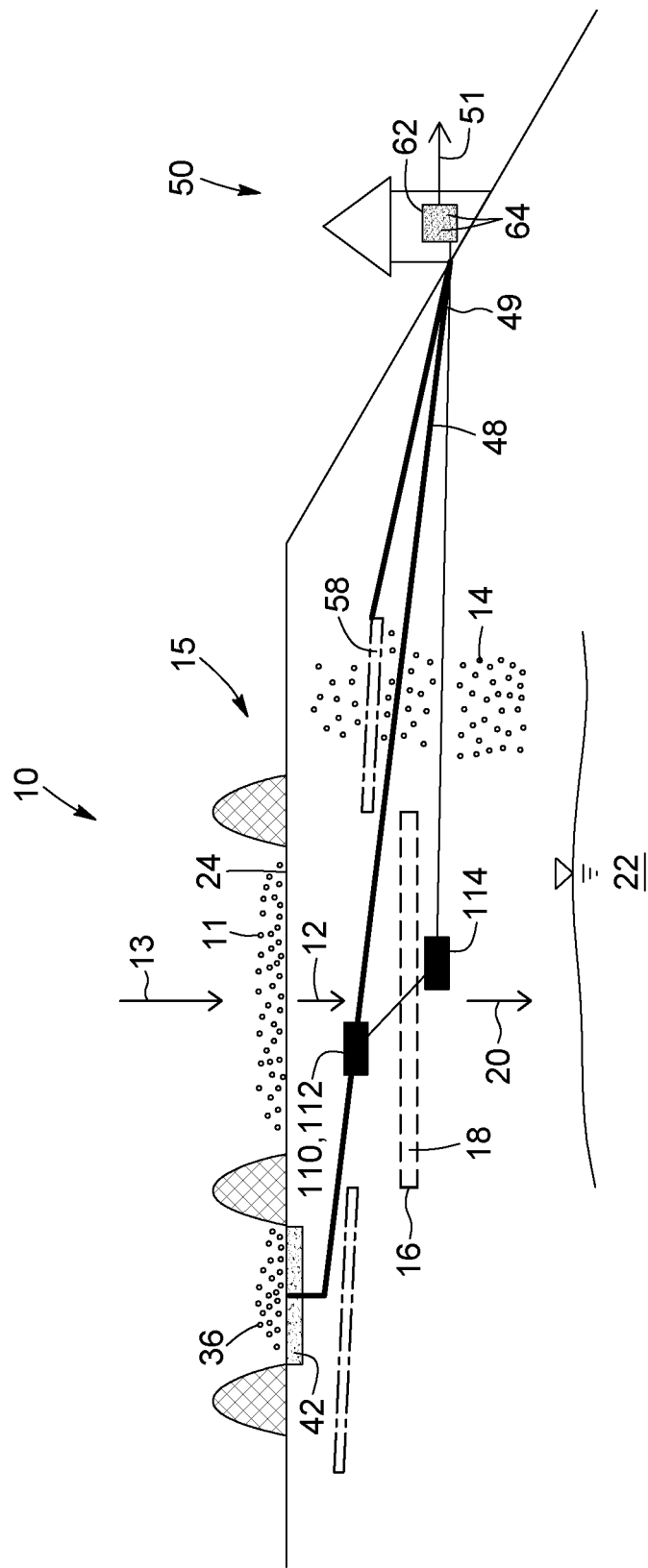
FIG. 8 is an elevation view of the system of FIG. 7.

Referring now to FIGS. 7 and 8, in one implementation, the system (10) includes both the adsorption layer (16) of bone char particulates, titanium dioxide particulates and/or aluminum oxide particulates (18) and the impermeable membrane (58), which are buried in the granulate particles (14) so that the adsorption layer (16) can be in vertical alignment with the destruction area (28). The impermeable membrane (58) can extend outwardly from the periphery of the adsorption layer (16) (i.e., radially from the adsorption layer (16)). Thus, the contaminated aqueous flow (12) produced can naturally percolate down through the granulate particles (14) to contact the adsorption layer (16), at least in part, while the contaminated aqueous flow (48) produced can directly be supplied to the water treatment unit (50) via pipe (52), to contact the adsorption layer (62). The impermeable membrane (58) can optionally collect part of the contaminated water (12), which has not contacted the adsorption layer (16) of bone char particulates, titanium dioxide particulates and/or aluminum oxide particulates (18), to contact the adsorption layer (62). The manufacturing costs of the system (10) can thus be reduced by reducing the surface area of the adsorption layer (16). For example, the surface area of the adsorption layer (16) can substantially correspond to the surface area of the destruction area (28). The efficiency of the system (10) in adsorbing the munitions contaminants present in the contaminated water stream (12) remains the same, as the impermeable membrane (58), which extends outwardly from the periphery of the adsorption layer (16), can collect the contaminated water (12) which percolates in periphery of the adsorption membrane (16), and supply it to the water treatment unit (50), using gravity or pumps. It is however noted that, in another scenario, the impermeable layer (58) can only be used to deviate the contaminated aqueous flow (12) towards the adsorption layer (16), being buried in the granulate particles (14).

Figure 10:
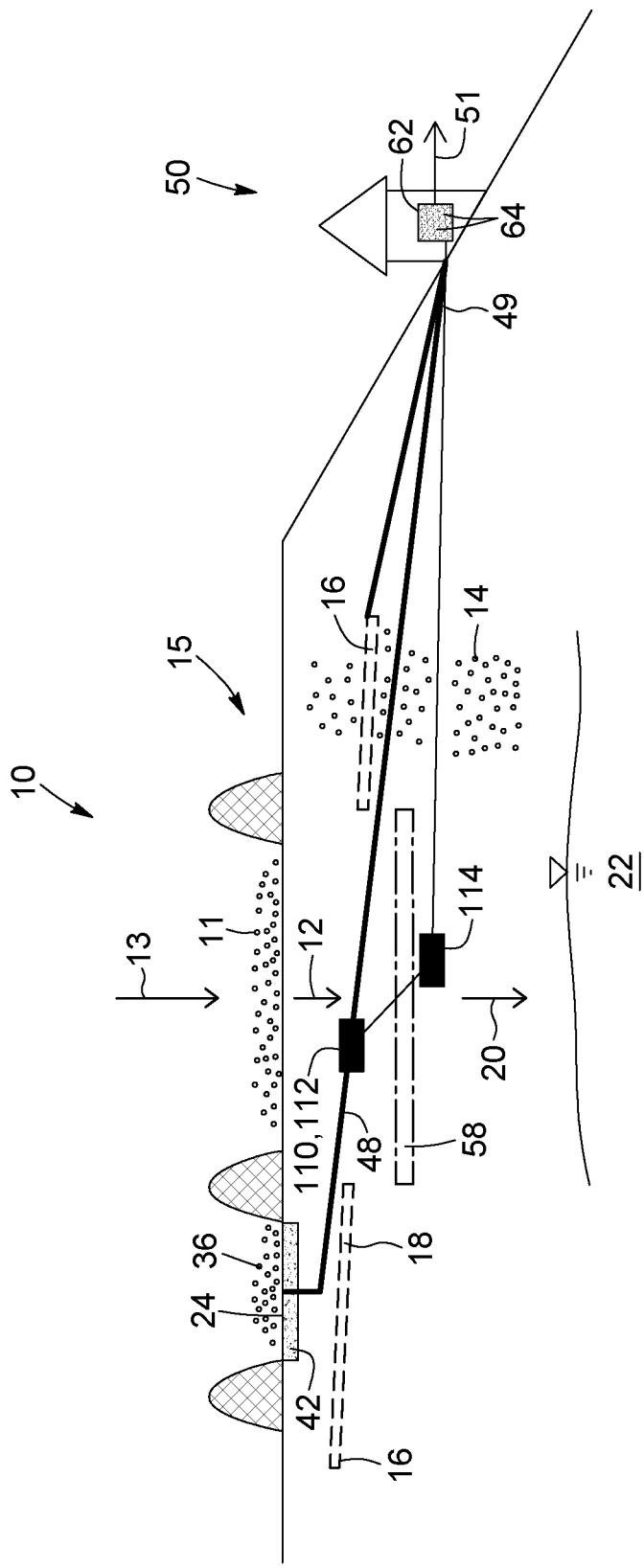
FIG. 10 is an elevation view of the system of FIG. 9.

Referring now to FIGS. 9 and 10, in one implementation, the adsorption layer (16) made of bone char particulates, titanium dioxide particulates and/or aluminum oxide particulates (18) can extend outwardly from the periphery of the impermeable membrane (58) (i.e., radially from the impermeable membrane (58)) so that the impermeable membrane (58) can be in vertical alignment with the destruction area (28). Thus, the contaminated aqueous flow (12) produced, at least in part, can directly be collected and supplied to the water treatment unit (50) via pipe (52), to contact the adsorption layer (62). Part of the contaminated water (12), the one that has not been collected by the impermeable membrane (58), can optionally contact the adsorption layer (16) so as to produce a treated aqueous steam (20). The manufacturing costs can also be reduced according to this scenario, while the surface area of the adsorption layer (16) is reduced. The efficiency of the system (10) in adsorbing the munitions contaminants (11) which are present in the contaminated water stream (12) also remains the same. Indeed, the adsorption layer (16), which extends outwardly from the periphery of the impermeable layer (58), can only be sized to treat the contaminated water (12) which percolates in periphery of the impermeable membrane (58) so it can percolate through the earth towards groundwater (22).

In one scenario, the adsorption layer (16) can be buried deeper in the granulate particles (14) than the impermeable membrane (58) (FIGS. 7 and 8). In another scenario, the impermeable membrane (58) can be buried deeper in the granulate particles (14) than the adsorption layer (16) (FIGS. 9 and 10). Alternatively, the adsorption layer (16) and the impermeable membrane (58) can be buried at substantially the same depth in the ground. It is further noted that that the impermeable membrane (58) and the adsorption layer (16) can present the same slope (i.e., they can be oriented substantially parallel, or in the same plane), or a different slope. Indeed, the angle between the adsorption layer (16) and the vertical axis (Y), and the angle between the impermeable membrane (58) and the vertical axis (Y) can be different.

In some implementations, the impermeable membrane (58) can be configured to prevent overflow of the contaminated water (12) that has been collected by the impermeable membrane (58) towards the adsorption layer (16) (FIGS. 9 and 10) and/or towards the granulate particles (14) (FIGS. 7 and 8). For example, the impermeable membrane (58) can be configured in the granulate particles (14) with a substantially curved shape so as to prevent the collected contaminated water (12) to reach the adsorption layer (16) of bone char particulates (18) and/or the granulate particles (14).

Figure 11:
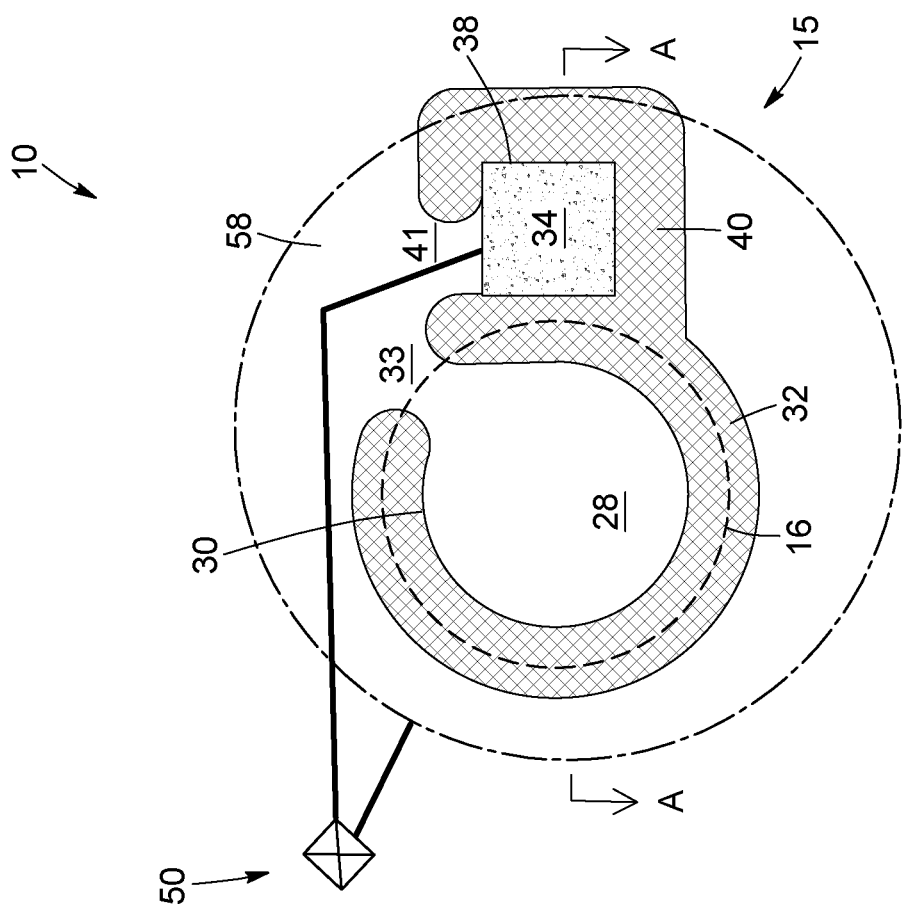
FIG. 11 is a top plan view of a system for treating the contaminated aqueous flow in accordance with yet another implementation.
Figure 12:
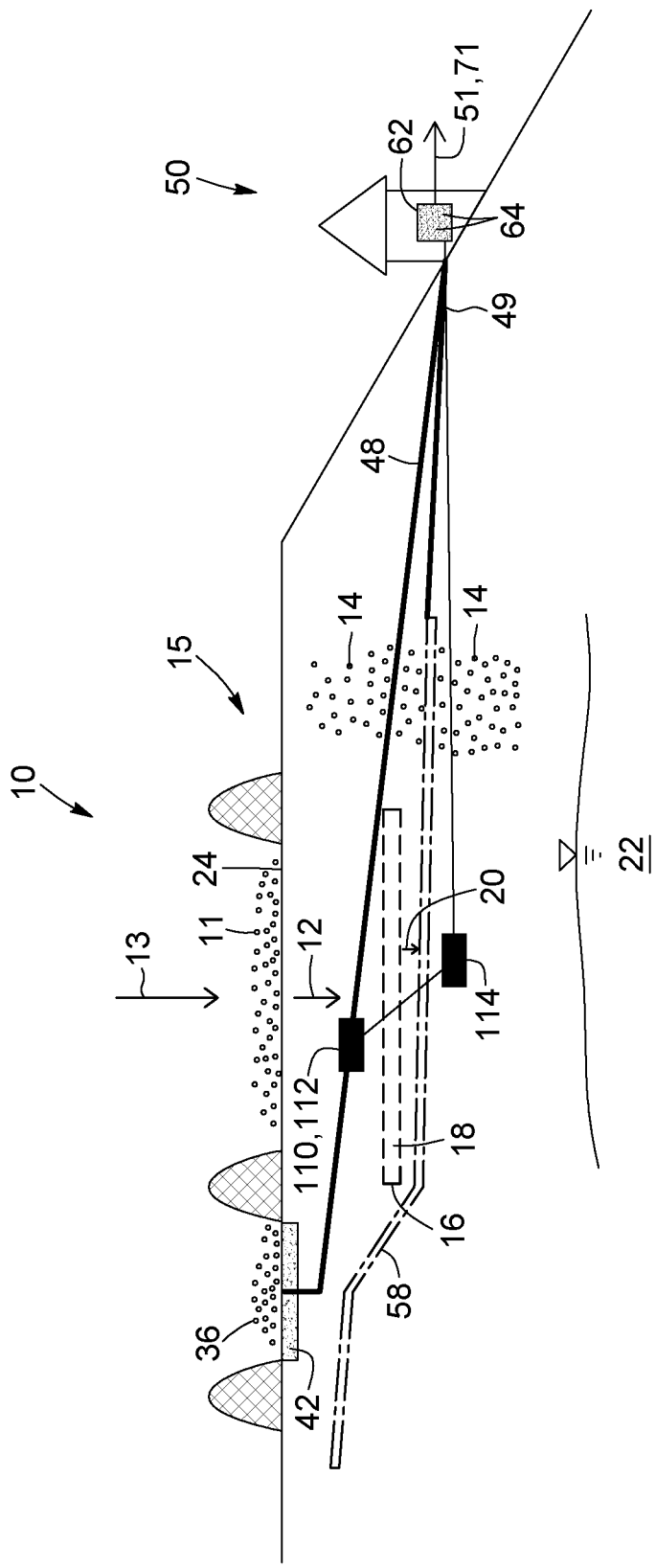
FIG. 12 is an elevation view of the system of FIG. 11.

Referring now more particularly to FIGS. 11 and 12, in one implementation, the impermeable membrane (58), in vertical alignment with both the destruction and the burning areas (28, 34), can be provided below the adsorption layer (16), which is provided in vertical alignment with the destruction area (28). Thus, the contaminated water stream (12) can naturally percolate down through the granulate particles (14) to contact the adsorption layer (16) of bone char particulates, titanium dioxide particulates and/or aluminum oxide particulates (18) to produce a treated aqueous flow (20) having a first munitions contaminants content. Then, the produced treated aqueous stream (20), instead of percolating through the earth with the interstitial water, can be collected by the impermeable membrane (58) and supplied to the water treatment unit (50), via the pipe (66), so as to contact the adsorption layer (62) to produce a polished aqueous flow (71) having a second munitions contaminants content, which can be below the first munitions contaminants content. The system (10) according to this scenario can be expensive to put in place, but can provide interesting results in terms or munitions contaminants contents of the polished aqueous stream (71). The first adsorption layer is thus provided in situ, while the second adsorption layer is provided ex situ, in series with the first adsorption layer.

Referring now more particularly to FIGS. 13 and 14, in one implementation, the system (10) can further include a contaminated water reservoir (140), which is formed in the impermeable membrane (58) for collecting the contaminated aqueous water (12), prior it can be pumped out through the pipe (66) towards the water treatment unit (50), using a pumping system installed in the reservoir (140) for example. Indeed, as mentioned above, this configuration of the system (10) can help to avoid breaking the impermeable membrane (58) prematurely (FIGS. 13 and 14). A manhole (142) can also be provided so that an operator can access the contaminated water reservoir (140).

Figure 16:
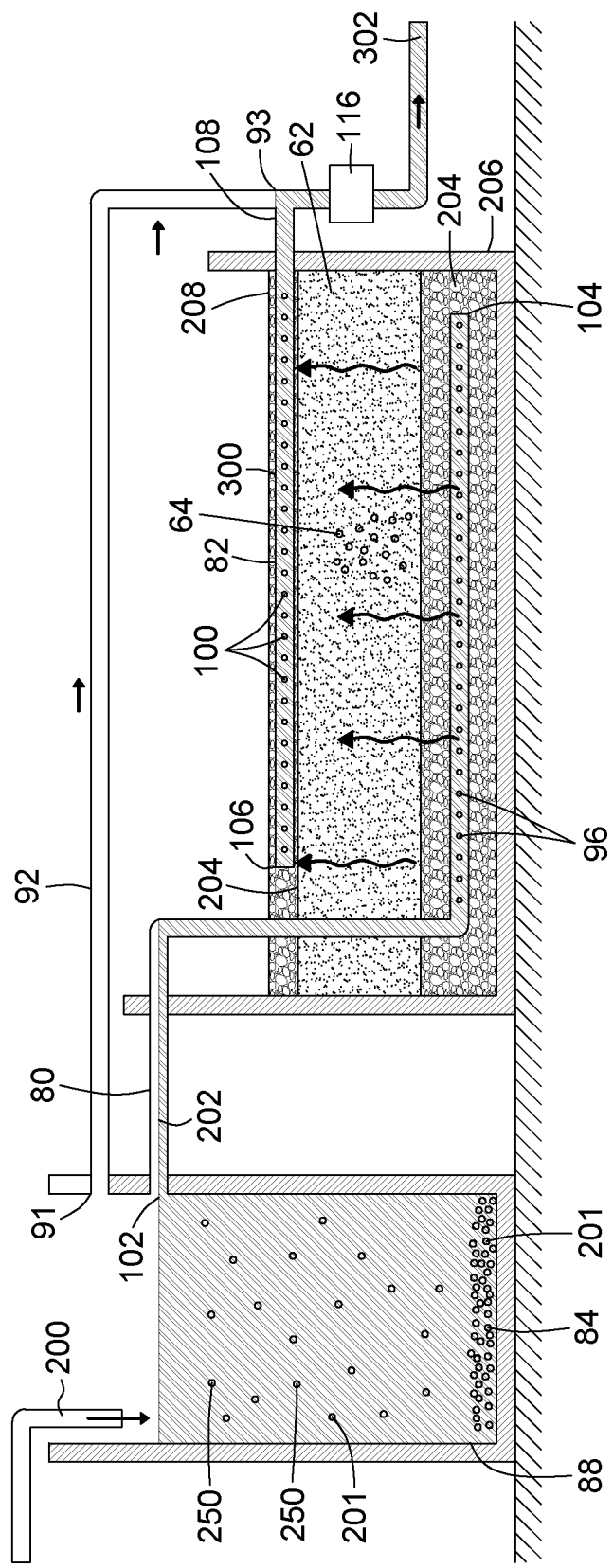
FIG. 16 is a cross-sectional view of a water treatment unit in accordance with yet another implementation.

Now referring to FIG. 16, in one implementation, the water treatment unit (50) which is configured to receive and treat the contaminated aqueous flow or combined contaminated aqueous flow (48 or 49) (FIGS. 3 to 14), the contaminated aqueous flow (12) (FIGS. 5 to 10, 13 and 14) and/or the treated aqueous flow (20) (FIGS. 11 and 12) includes the adsorption layer (62). As mentioned above, the contaminated aqueous flow (48), the contaminated aqueous flow (12) and/or the treated aqueous flow (20) (FIGS. 11 and 12) can be combined prior to contacting the adsorption layer (62), or alternatively, these streams can be treated separately by contacting the adsorption layer(s) which include bone char particulates, titanium dioxide particulates and/or aluminum oxide particulates, or other water treatment units. For example, the water treatment unit (50) can include a plurality of adsorption layers, such as the adsorption layer (62), arranged in parallel. Alternatively, the water treatment unit (50) can include a plurality of adsorption layers, such as the adsorption layer (62), arranged in series. The contaminated aqueous flow to be treated by the water treatment unit (50) will be referred to as (200) in FIG. 16, while the treated aqueous flow that is produced will be referred to as (300) for the sake of simplifying the description only.

Still referring to FIG. 16, the water treatment unit (50) can optionally include a settling or sedimentation reservoir (84) which can be filled by the contaminated aqueous flow (200). Particles (201), which can be in suspension in the contaminated aqueous flow (200), can thus settle to a bottom section of the settling or sedimentation reservoir (84) to produce a contaminated aqueous flow (202), which is depleted in the particles (201) in suspension. The water treatment unit (50) can optionally include a bypass pipe (92) which has a first end (91) in fluid communication with an upper section of the settling or sedimentation reservoir (84) and a second end (93). The bypass pipe (92) is configured to prevent an overflow of the contaminated water (200) from reaching the adsorption layer (62). For example, in a scenario where the flow rate of the water (13) has increased, an overflow of the contaminated water (200) can be expelled of the settling or sedimentation reservoir (84), so it does not contact the adsorption layer (62). For example, the overflow of contaminated water (200) can flow through the by-pass pipe (92) towards an additional adsorption layer, which could be similar to the adsorption layer (62), towards other water treatments, or out of the water treatment unit (50) towards the water disposal site.

Still referring to the implementation of FIG. 16, and as mentioned above, the water treatment unit (50) can further include the adsorption layer (62) so as to promote adsorption of the munitions contaminants which are present in the contaminated aqueous flow (202), upon contact of the contaminated aqueous flow (202) and the bone char particulates, titanium dioxide particulates and/or aluminum oxide particulates (64) to produce the treated aqueous flow (300), which is depleted in the munitions contaminants. It is noted that the bone char particulates, titanium dioxide particulates and/or aluminum oxide particulates (64) can be embedded in granulate particles (204), as described above (e.g., sand, gravel, rocks, activated carbon, peat moss, coconut coir, etc.). For example, the bone char particulates, titanium dioxide particulates and/or aluminum oxide particulates (64) can be supported by a first or bottom layer (206) of the granulate particles (204), and can be covered up by a second or top layer (208) of the granulate particles (204). Confining the bone char particulates, titanium dioxide particulates and/or aluminum oxide particulates (64) can however be made differently (e.g., screen material, porous concrete, etc. can be used to sandwich the particulates). It is noted that the support structure (126) defined above (FIG. 15) can optionally be used to contain the particulates (64) of the adsorption layer (62) therein. The water treatment unit (50) can further include an inlet pipe (80) in fluid communication with the settling or sedimentation reservoir (84), which is configured to receive the contaminated aqueous flow (202) which is depleted in the particles (201) in suspension. The inlet pipe (80) has a first end (102), in fluid communication with the settling or sedimentation reservoir (84) and a second end (104). As shown, the inlet pipe (80) can be buried in the bottom layer (206) of granulate particles (204). The water treatment unit (50) can further include an outlet pipe (82) which is configured to receive the treated aqueous flow (300) obtained. As shown, the outlet pipe (82) can be buried in the top layer (208) of granulate particles (204). The outlet pipe (82) has a first end (106) and a second end (108) to expel the treated water stream (300) therefrom. The second end (108) of the outlet pipe (82) can be in fluid communication with an end section of the bypass pipe (92) so that the overflow of contaminated water (200) can be combined with the treated aqueous flow (300) prior to be expelled from the water treatment unit (50), towards the surface water, the ground to percolate through the earth towards groundwater, a sewage system, a pluvial system, or a water treatment plant, etc. Alternatively, the treated aqueous flow (300) can be expelled via the second end (108) of the outlet pipe (82), without being combined with the overflow of contaminated water.

As shown in the implementation of FIG. 16, the inlet pipe (80) can be configured so as to be in vertical alignment with the outlet pipe (82), and the outlet pipe (82) can be located above the inlet pipe (80). In other words, the bone char particulates, titanium dioxide particulates and/or aluminum oxide particulates (64) can be sandwiched between the inlet pipe (80) which is buried in the bottom layer (206) of granulate particles (204) and the outlet pipe (82) which is buried in the top layer (208) of granulate particles (204). Such configuration of the water treatment unit (50) can increase the adsorption efficiency between the bone char particulates, titanium dioxide particulates and/or aluminum oxide particulates (64) and the contaminated water stream (202) by increasing the contact time between the contaminated aqueous flow (202) and the particulates (64) (i.e., the contact time between the munitions contaminants which are present in the contaminated water (202) and the particulates (64)).

Still referring to the embodiment of FIG. 16, the inlet pipe (80) can include spaced apart outlet apertures (96) along a length thereof for allowing the contaminated water stream (202) to flow therethrough. The outlet pipe (82) can also include spaced apart inlet apertures (100) along a length thereof for allowing the treated water stream (300) to flow therethrough from the adsorption layer (62). Moreover, as shown, the second end (104) of the inlet pipe (80) and the first end (106) of the outlet pipe (82) can be capped.

Thus, the contaminated water (202) can flow through the inlet pipe (80), through the spaced apart outlet apertures (96) and then percolate upwardly through the adsorption layer (62), where the munitions contaminants which are present in the contaminated water stream (202) can be adsorbed, at least in part, by the bone char particulates, titanium dioxide particulates and/or aluminum oxide particulates (64). The produced treated water stream (300), which is now depleted in the munitions contaminants, can percolate upwardly through the spaced apart inlet apertures (100) of the outlet pipe (82) and through the outlet pipe (82) towards the second end (108). The treated aqueous stream (300) can then be combined with the overflow of water contaminated water (200) which flows in the bypass pipe (92). The combined aqueous stream (302) can then be expelled from the water treatment unit (50). In this scenario, the combined aqueous flow can however have a munitions contaminants content greater than the munitions contaminants content of the treated aqueous flow (300) expelled from the outlet pipe (82), as the bypass water (92) has not been fully treated.

For example, the distance between the inlet and outlet pipes (80, 82) can be between about 30 centimeters and about 5 meters, as long as the distance provides a sufficient contact time between the contaminated stream and the bone char particulates, titanium dioxide particulates and/or aluminum oxide particulates, as described above. Indeed, the munitions contaminants content obtained has to reach a desired threshold, so that the treated aqueous flow (300) can be supplied to the water disposal site.

In one scenario, the treated aqueous flow (300) can be supplied to a draining pit having a bottom section made of granulate particles, such as sand, rocks, gravel, etc. (not shown), so as to allow the treated aqueous flow (300) to naturally percolate down with the interstitial water, towards the saturated zone of the earth for example.

In some implementations, a building can house the water treatment unit (50). In one scenario, the building can be insulated, so as to be operable in colder regions, for example. In another scenario, the water treatment unit (50) can be buried underground, such as in the granulate particles (14). It is however noted that the adsorption layer (62) does not necessarily need to be provided inside a building.

For example, the water treatment unit (50) can treat over 1 m³/year, over 500 m³/year, over 1000 m³/year, over 5,000 m³/year, or over 20,000 m³/year of the contaminated aqueous flow, such as contaminated aqueous flow (200).

Thus, the water treatment unit(s) can be composed of decantation basin(s), flow regulator(s), main basin(s) containing adsorbing media, and release point(s) directing treated water towards a naturally occurring wetland adjacent to the site.

Referring back to FIGS. 4, 6, 8, 10, 12 and 14, in some implementations, the system (10) can further include flow meters to measure the flow rates of the different aqueous streams. For example, the system (10) can include a flow meter (110) positioned so as to be in fluid communication with the contaminated aqueous flow (12) prior it contacts the bone char particulates (18), a flow meter (112) positioned so as to be in fluid communication with the contaminated aqueous flow (48) prior it contacts the bone char particulates, titanium dioxide particulates and/or aluminum oxide particulates (64), a flow meter (114) positioned so as to be in fluid communication with the treated aqueous flow (20) after it has contacted the bone char particulates, titanium dioxide particulates and/or aluminum oxide particulates (18) (or positioned past the impermeable membrane (58), as shown in FIGS. 6, 10 and 12) and/or a flow meter (116) positioned so as to be in fluid communication with the treated aqueous flow (300) after it has contacted the bone char particulates, titanium dioxide particulates and/or aluminum oxide particulates (FIG. 16). The system (10) can further include sampling units to collect data on the munitions contaminants content of the different aqueous streams. For example, the system (10) can include a sampling unit positioned so as to be in fluid communication with the contaminated aqueous flow (12) prior it contacts the bone char particulates, titanium dioxide particulates and/or aluminum oxide particulates (18), a sampling unit positioned so as to be in fluid communication with the contaminated aqueous flow (48) prior it contacts the bone char particulates, titanium dioxide particulates and/or aluminum oxide particulates (64), a sampling unit positioned so as to be in fluid communication with the treated aqueous flow (20) after it has contacted the bone char particulates, titanium dioxide particulates and/or aluminum oxide particulates (18) (or positioned past the impermeable membrane (58), as mentioned above) and/or a sampling unit positioned so as to be in fluid communication with the treated aqueous flow (300) after it has contacted the bone char particulates, titanium dioxide particulates and/or aluminum oxide particulates (FIG. 16). For example, lysimetric boxes can be provided above and under the adsorption layer in order to monitor its durability.

Even though the adsorption layer (16) of the implementations of FIGS. 2 to 4 and 7 to 14 are illustrated as being buried in the granulate particles (14), it is noted that an adsorption layer or device which includes bone char particulates, titanium dioxide particulates and/or aluminum oxide particulates can be provided anywhere to treat a contaminated aqueous stream which includes, for example, munitions contaminants (11). In other words, as described above, the adsorption layer does not necessarily need to be located below the destruction and/or burning areas (28, 34). In one scenario, it can be provided remotely from a military training range (15), a destruction site, a munition production site, and the like, as long as the contaminated water streams (12 and/or 48) can be collected and subjected to an adsorption layer which includes bone char particulates, titanium dioxide particulates and/or aluminum oxide particulates, the adsorption layer (62) for example. The systems and processes described above can thus be used to treat one or more contaminated aqueous stream(s) containing water and contaminants so as to produce one or more treated aqueous streams which are depleted in the contaminants. In a system that includes more than one adsorption layer, the adsorption layers can be provided in parallel or in series. As mentioned above, the contaminants to be adsorbed can be munitions contaminants (e.g., metallic contaminants, energetic material contaminants, propellant contaminants, etc.), but also metallic contaminants or other contaminants that can be adsorbed by the bone char particulates, titanium dioxide particulates and/or aluminum oxide particulates. It is also noted that, in one scenario, the adsorption layer or device can be made of bone char particulates only. In another scenario, the adsorption layer or device can be made of titanium dioxide particulates only. In yet another scenario, the adsorption layer or device can be made of aluminum oxide particulates only. The adsorption layer can also be made of any suitable combination of bone char particulates, titanium dioxide particulates and/or aluminum oxide particulates, as described above.

The systems and processes disclosed can therefore involve one or more horizontal adsorption layer(s) being buried in the unsaturated zone below a limited extent training area such as a military training range (e.g., grenade, anti-tank, small arms, demolition, etc.), a destruction sites or a munition production sites, to avoid munitions contaminants to reach an aquifer (i.e., groundwater). In other implementations, the adsorption layer can be built within a dam, in a river for example, to treat contaminated water as it flows therethrough. In another scenario, the adsorption layer or an adsorption device can be provided at the outflow of, or within, a contaminated water collecting system in military training ranges (e.g., grenade, anti-tank, small arms, demolition, etc.), destruction sites or munition production sites, as described herein. For example, a cartridge that includes the bone char, titanium dioxide and/or aluminum oxide particulates can be positioned at the outflow of the bullet boxes.

In the present description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures or described in the present disclosure are embodiments only, given solely for exemplification purposes.

Moreover, components of the present system and/or steps of the process(es) described herein could be modified, simplified, altered, omitted and/or interchanged, without departing from the scope of the present disclosure, depending on the particular applications which the present system is intended for, and the desired end results, as briefly exemplified herein and as also apparent to a person skilled in the art.

In addition, although the embodiments as illustrated in the accompanying drawings comprise various components, and although the embodiments of the present system and corresponding portion(s)/part(s)/component(s) as shown consist of certain geometrical configurations, as explained and illustrated herein, not all of these components and geometries are essential and thus should not be taken in their restrictive sense, i.e. should not be taken so as to limit the scope of the present disclosure. It is to be understood, as also apparent to a person skilled in the art, that other suitable components and cooperation thereinbetween, as well as other suitable geometrical configurations may be used for the present system and corresponding portion(s)/part(s)/component(s) according to the present system, as will be briefly explained herein and as can be easily inferred herefrom by a person skilled in the art, without departing from the scope of the present disclosure.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

Experiments and Results

Part 1

A number of experiments were conducted to assess operating parameters and performance for adsorption of contaminated aqueous streams. Field and laboratory tests were performed to develop an adsorption layer that would adsorb contaminants moving with soil water under military training ranges (e.g., grenade, anti-tank, small arms, demolition, etc.), destruction sites or munition production sites. A pilot test was conducted to evaluate different types of adsorption particulates.

Figure 17:
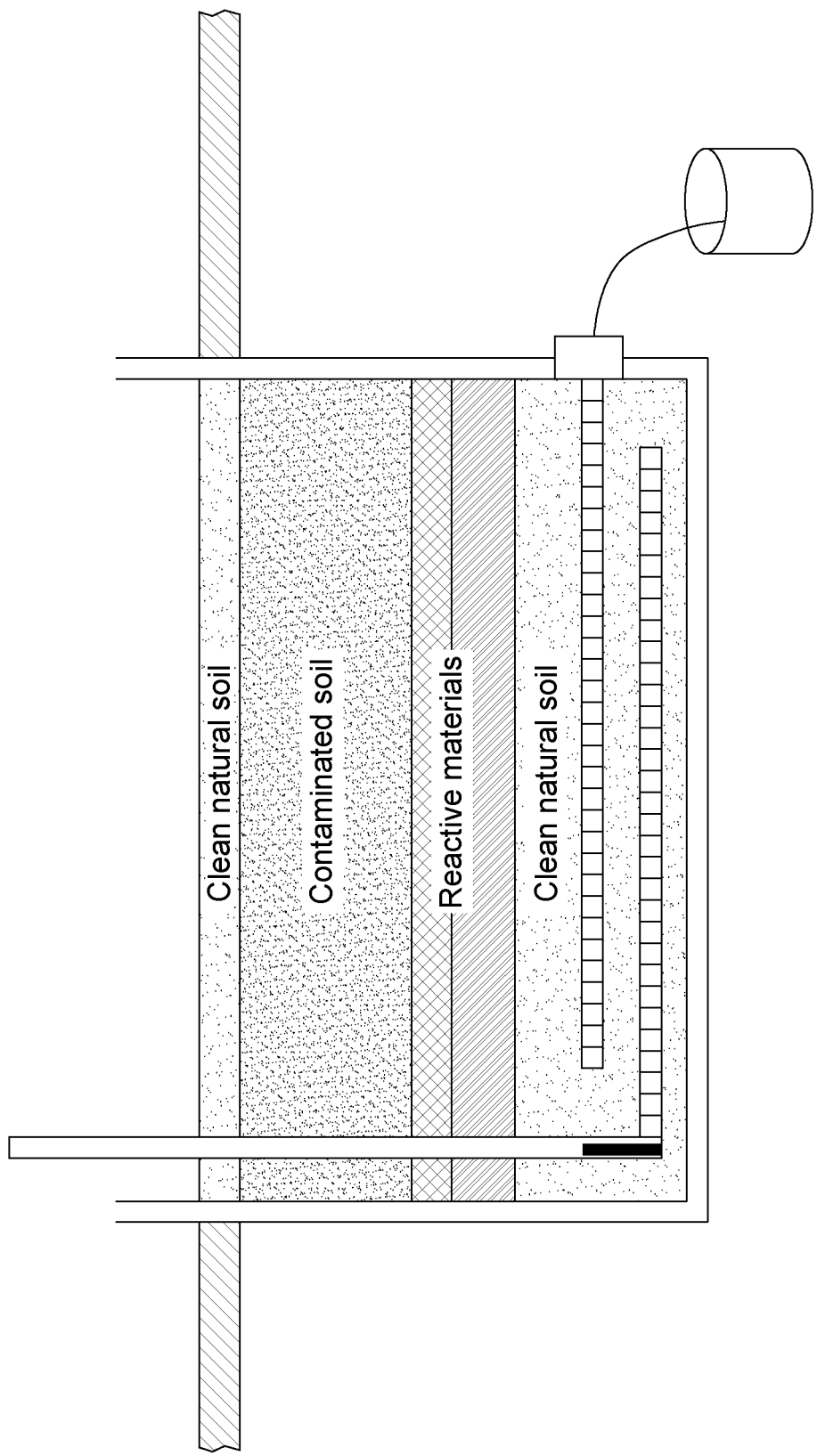
FIG. 17 schematically illustrates an experimental container or unit which is configured to treat a contaminated aqueous flow.
Figure 18:
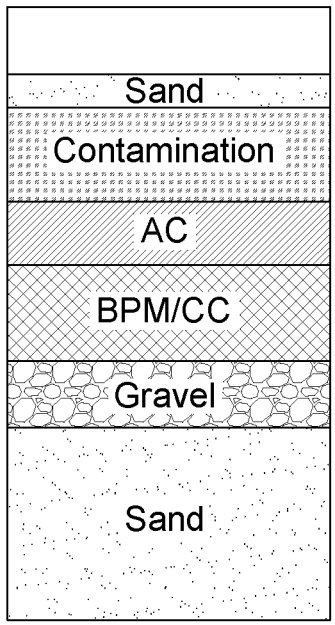
FIG. 18 schematically illustrates the experimental containers nos. 1 to 6 used to treat the contaminated aqueous flow.
Figure 18:
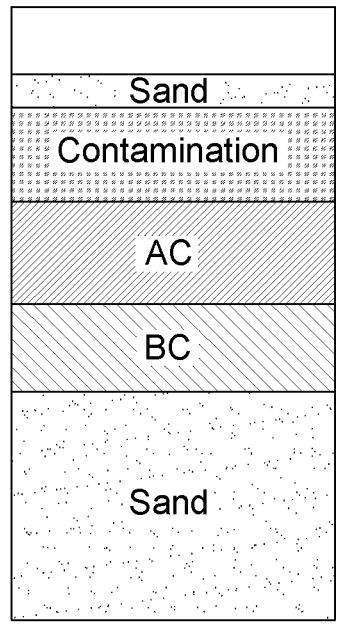
Figure 18:
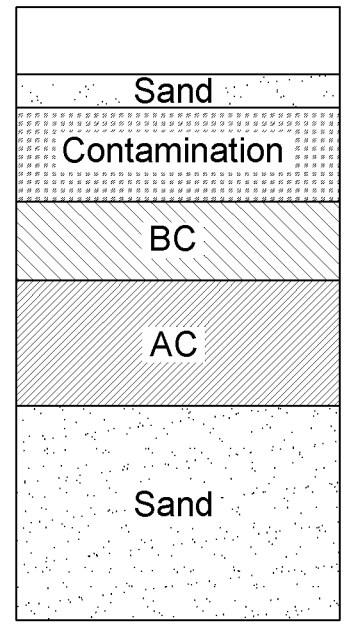
Figure 18:
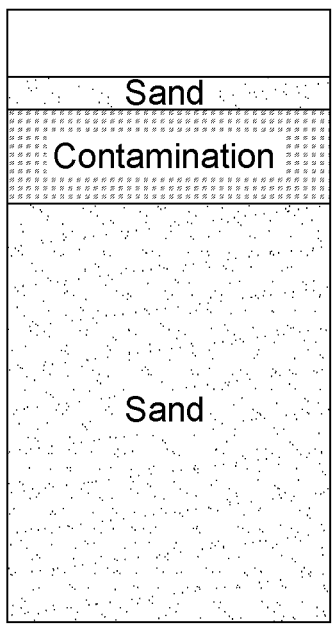
Figure 18:
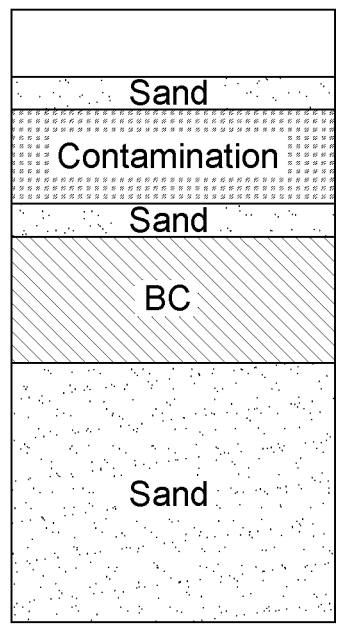
Figure 18:
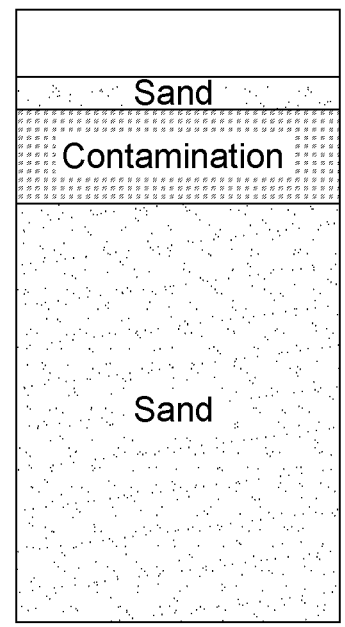

The objective was to determine the efficiency of different adsorption layers under real field conditions (freezing-thawing, rain and snowmelt infiltrations). The tests were performed into 2.56 m$^3$ watertight containers buried into the soil (FIG. 17). Four containers (FIG. 18) were installed: three containing different adsorption particulates. The first container included activated carbon (AC) particulates covering brown peat moss particulates (BPM) mixed with coconut coir particulates (CC), the second container included activated carbon particulates covering bone char particulates (BC), while the third container included bone char particulates covering activated carbon particulates. No adsorption particulate was introduced into the fourth container as it was used as a control to compare adsorption efficiency. The 1182±3 kg of contaminated soil put in each container was made by mixing a destruction range surface soil with 160 kg of contaminated soil from a small arm range (to add metallic contaminants), 16 g of ammonium perchlorate and 80 g of crushed composition B. Two other containers (containers nos. 5 and 6 of FIG. 18) were installed to replicate the highest metallic contaminants concentrations measured in the soil of Canadian grenade ranges. A synthetic contaminated soil was produced by mixing a natural clean soil with metallic powders and 20 g of crushed composition B. A solution of 1 liter of dissolved ammonium perchlorate (16 g/L) was spread over the surface of all containers, except container no. 5. The munitions contaminants contents of the treated aqueous streams were evaluated 23 times for containers no. 1 to 4 and 14 times for containers no. 5 and 6. Energetic material contaminants concentrations, metallic contaminants concentrations, perchlorate concentrations and physico-chemical parameters (pH, Eh, temperature and electrical conductivities) were followed. The analytical results from water samples (field and laboratory tests) were compared to the drinking water guidelines from Health Canada and to the aquatic life criteria. Two flow meters were also installed to measure the water outflow from the containers to establish a mass balance of the contaminants.

Figure 19:
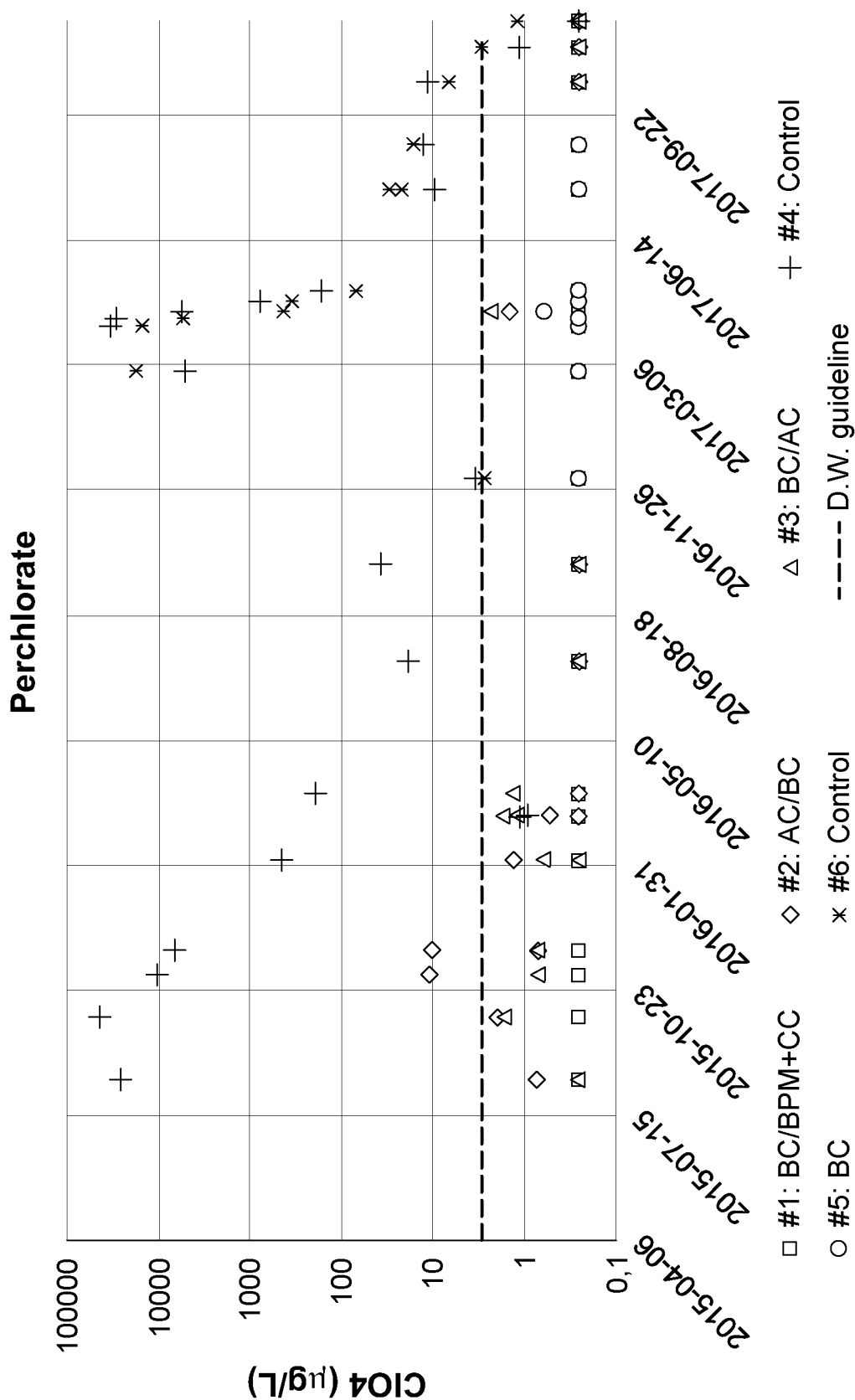
FIG. 19 graphically illustrates the evolution of perchlorate concentrations over time in the treated aqueous flow which is depleted in the munitions contaminants.

The adsorption layers used in containers no. 1 to 3 performed well to decrease perchlorate and energetic material contaminants concentrations below the most severe of the two water guidelines. Despite the high concentrations measured in the control for perchlorate (up to 43000 µg/L), RDX (640 to 40340 µg/L), HMX (267 to 2860 µg/L) and TNT (15 to 5300 µg/L), all treatments (AC/BPM+CC of container no. 1, AC/BC of container no. 2 and BC/AC of container no. 3) succeeded in removing more than 99.9% of the contaminants and in lowering the contaminants concentrations below the guidelines. To this effect, FIG. 19 illustrates the evolution of perchlorate concentrations over time at the bottom of the containers nos. 1 to 6. For metallic contaminants, the low concentrations measured in the control were caused by the presence of clean sand between the contaminated layer and the sampling point (located at the outlet of the container), which caused a delay on the arrival of metallic contaminants at the sampling points. Antimony took 20 months to migrate to the bottom of the container. This is something not possible to observe in the laboratory column tests since no soil is used. A mass balance calculated from measured concentrations in water and measured or simulated water flow rates showed that containers with adsorption treatments released 99.9% less perchlorate and energetic material contaminants than the control container no. 4. For metallic contaminants, the mass balance calculation indicated that more than 97% of antimony was removed. The treatment AC/BPM+CC (container no. 1) leached some zinc.

In parallel to the field work, eight saturated column tests were conducted to evaluate the efficiency and the lifespan of the different adsorption layers (i.e., of the different adsorption particulates). The experiments were conducted with the same three adsorption materials (in duplicate) as in the field tests. A contaminated water, produced by the leaching of the same stock of contaminated soil used in the containers test, was injected into the columns at an average rate of 19.9 mL/hr, representing the equivalent of 330 years of infiltration for the 479 days of the experiment. Water samples were collected twice a week at the outflow of each column. A total of 1064 samples were collected. Samples were analyzed for metallic contaminants, perchlorate and energetic material contaminants to determine whether water guidelines were exceeded. Outflow concentrations of contaminants were followed. Results were compared to an empty column used as a control.

Figure 20:
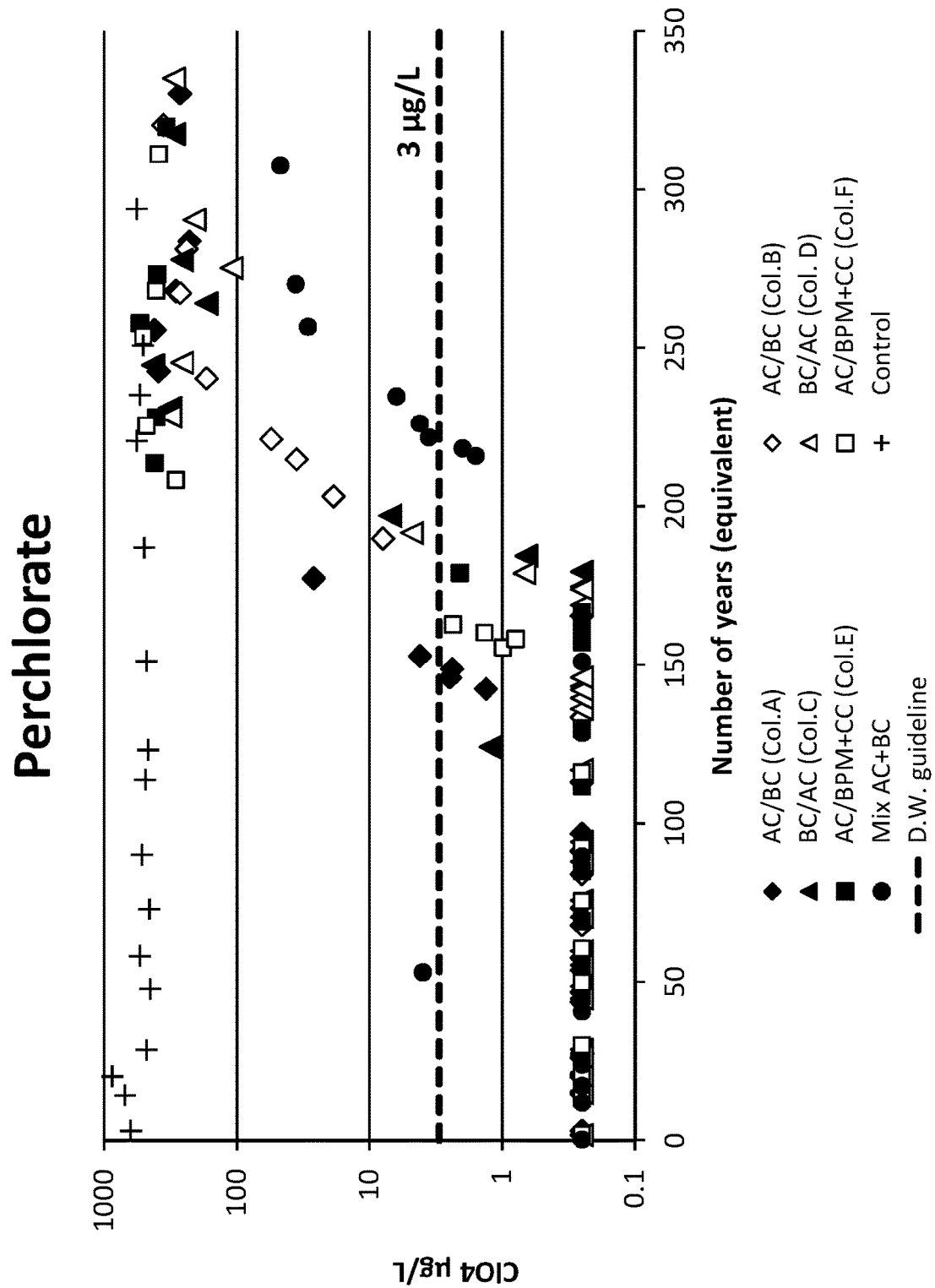
FIG. 20 graphically illustrates the evolution of perchlorate concentrations relative to the infiltration years in the treated aqueous flow which is depleted in the munitions contaminants.
Figure 21:
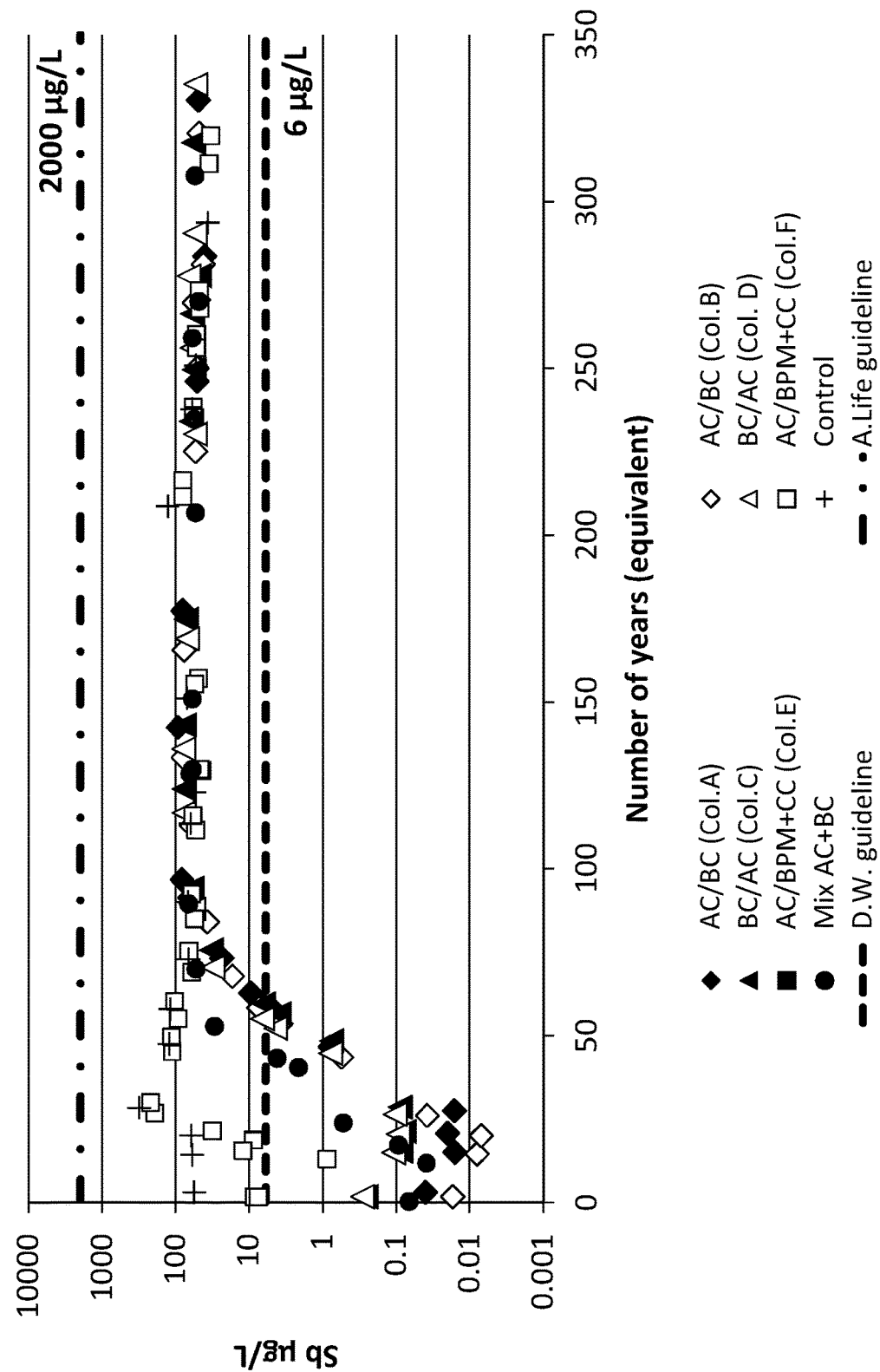
FIG. 21 graphically illustrates the evolution of antimony concentrations relative to the infiltration years in the treated aqueous flow which is depleted in the munitions contaminants.

Column tests with 15 cm thick adsorption particulates worked extremely well to adsorb dissolved energetic material contaminants, perchlorate and metallic contaminants from the contaminated water injected. In fact, most of the contaminants tested were measured below the selected water quality guidelines at the outlet of the treatment column during a simulated period of infiltration of over 300 years on average. As shown in FIGS. 20 and 21, perchlorate and antimony had a breakthrough (observed concentrations above guideline) at the outflow of the treatment columns after a reasonable period of respectively 50 years for antimony (55 years for AC/BC or BC/AC and 43 years for AC/BC mixture, but 0 year for AC/BPM+CC) and 175 years for perchlorate (150 years for AC/BC, 175 years for BC/AC and AC/BPM+CC, and 215 years for AC/BC mixture). The only treatment which did not work was the AC/BPM+CC treatment for antimony that brokethrough right at the beginning of the contaminated water injection. Using the above breakthrough for antimony and perchlorate and assuming that the breakthrough was reached at the last available chemical analysis below the guidelines for the other parameters tested (EM (i.e., HMX, RDX, TNT) at 314-343 years; cadmium, copper, lead and zinc at 308-335 years), it is possible to evaluate the lifespan (considering a layer of 30 cm and a yearly infiltration of 350 mm for eastern Canadian climatic conditions) of the adsorption materials or particulates and their adsorption capacity (mass of contaminants adsorbed per mass of adsorption particulates). The above number of years was considered more than enough for the design of a reactive barrier and the extra years normally needed to reach the breakthrough account for a security factor. For all treatments tested, the lifespan of EM was on average 652 years, while between 314 and 436 years for perchlorate, 637 years for copper, zinc, cadmium and lead and on average 100 years for antimony (except for the AC/BPM+CC treatment, where it was 0). For all treatments, the adsorption capacity of the adsorption particulates calculated by the outflow concentrations method was on average 1820 mg RDX/kg, 480 mg HMX/kg, 215 mg TNT/kg, 300-400 mg $ClO_4$/kg, 37 mg Cu/kg, 160 mg Zn/kg, 4 mg Cd/kg, 15 mg Pb/kg and 25 mg Sb/kg. A mass balance was calculated on solid reactive material and resulted in values in the same order of magnitude as the one obtained by the outflow concentrations method, except for lead and antimony in the AC/BPM+CC treatment. The outflow concentrations method indicated an adsorption of 15.8 mg Pb/kg and of 0 mg Pb/kg with the AC/BPM+CC treatment, while the analysis of solid reactive material shown a leaching of 31.5 mg Pb/kg and an adsorption of 42.9 mg Sb/kg. Mass balance calculation in column tests indicated that the precision obtained was better with the outflow concentrations method than with the solid reactive material method. The outflow concentrations method does not necessitate additional extraction and the mass balance for energetic materials contaminants and perchlorate are possible. However, the mass balance realized on the reactive material allowed to determine where the adsorption occurred in the columns.

Part 2

Over the years, INRS conducted laboratory tests to develop a reactive barrier that would adsorb contaminants moving with soil water under grenade ranges or destruction sites. Column tests have shown the effectiveness of different reactive materials to remove metals, energetic materials and perchlorate dissolved in groundwater. In 2015, an outdoor pilot test was initiated with the more promising reactive materials to see their effectiveness under grenade range or destruction site field conditions. In parallel, laboratory column tests were performed to evaluate the lifespan of the reactive materials (Martel et al., 2019).

The field experiment aimed at comparing different reactive barriers to a control. Field test was realised in 2.56 $m^3$ plastic containers buried into the ground in order to: 1—Mimic real field conditions; 2—Have a well-controlled contaminated water infiltration (i.e. flowing vertically from an above contaminated soil layer without bias from neighbouring soil water or runoff) and; 3—Avoid spreading of contaminants via surface water runoff and contaminated water infiltration. Four containers were installed in 2015 and two others were added in 2016.

The experiment was realised in the experimental complex of DRDC-Valcartier Research Centre, Canada. In summer 2015, four impervious containers were buried into the ground to follow the soil water quality under different reactive barriers. Three were filled from bottom to top with layers of clean natural soil, reactive materials, contaminated soil and clean natural soil (#1, #2 and #3). A fourth container (#4) was filled from bottom to top with layers of clean natural soil, contaminated soil and clean natural soil to act as a control. In summer 2016, two impervious containers were added with higher metals concentrations in the contaminated layer. A first container (#5) was filled from bottom to top with layers of clean natural soil, reactive materials, contaminated soil and clean natural soil. A second container (#6) was filled from bottom to top with layers of clean natural soil, contaminated soil and clean natural soil to act as a control for container #5 both with high metals concentrations in the contaminated soil and representative of a grenade range worst case scenario.

The source of contaminants in 2015 was a soil made by mixing a soil from a destruction site and one from a backstop of a small arms range. More energetic materials and perchlorate were added to that soil in order to increase artificially the level of contamination and to correspond to the worst case scenario. The source of contaminant in 2016 was made by mixing metallic powders (Cu, Pb, Zn and Ni) and crushed composition B into a natural clean soil to produce a synthetic contaminated soil with higher metals concentrations than 2015. A solution of perchlorate was spread over the surface of containers (#1, #2, #3, #4, and #6) in 2016. The water quality at the outflows of the six containers was measured. The water samples from the reactive barriers were compared to the control.

A monitoring well was installed in each container to sample the soil water that had percolated (from rain and snow melt) through the soil. An overflow was installed close to the bottom of each container to prevent saturated condition in the above reactive barriers and in the contaminated soil. After each sampling event, the water at the base of the container was pumped and treated before disposal. In 2016, flowmeters were installed at the outflow of the new containers (#5 and #6).

The experiment ended on Oct. 10, 2018. The contaminated soil layers were sampled to establish a mass balance and tarps were installed over each container to prevent water infiltration. All material was dismantled in summer 2019.

Description of Membranes Tested and Results

Field Setup

In container #1, the reactive barrier was made of a 3-layer system. An activated carbon layer (BC-830AW) of 12 cm was placed over a 15 cm layer of 75% brown peat moss/25% coconut coir mixture over a 10 cm layer of washed gravel (6-12 mm). The activated carbon was used for its capacity to adsorb energetic materials and perchlorate compounds. The brown peat moss/coconut coir mixture was used for its capacity to adsorb metals. This organic layer was placed under the activated carbon as it may release humic substances that could reduce the efficiency of activated carbon if it placed above it. The washed gravel layer was used as a capillary barrier to increase the contact time of the soil water within the above organic layer.

In container #2, the reactive barrier was made of a 2-layer system. An activated carbon layer (BC-830AW) of 15 cm was placed over a 12 cm layer of bone char (10×28). The activated carbon was used for its capacity to adsorb energetic materials and perchlorate compounds while the bone char performs well to adsorb metals. When the experiment protocol was decided, no information was available on the potential impact of using activated carbon over bone char or bone char over activated carbon. It was then decided to test both systems under field conditions.

In container #3, the positions of the two layers making the reactive barrier were inversed compare to container #2. A bone char layer (10×28) of 13 cm was placed over a 17 cm activated carbon layer (BC-830AW). The activated carbon was used for its capacity to adsorb energetic materials and perchlorate compound while the bone char performs well to adsorb metals.

In container #4, no reactive material was used. A contaminated soil layer, equivalent to the one put in containers #1 to #3 was placed directly over the clean natural soil layer. This container is the control one and the water quality flowing out of it (i.e. from the water samples collected at the bottom of the container) was used as the base case to evaluate the efficiency of the different treatments tested in the 3 other containers.

In container #5, a 24 cm bone char layer (10×28) was used for its capacity to adsorb dissolved metals and RDX. This thickness was considered the minimum to prevent preferential flow at the field scale. A 7 cm layer of natural clean soil was placed between the bone char and the contaminated soil to prevent the migration of the contaminated soil through the reactive material layer during its implementation.

In container #6, no reactive material was used. A contaminated soil layer, equivalent to the one put in container #5 was placed directly over the clean natural soil layer. This container act as a control and the water quality flowing out of it (i.e. from the water samples collected at the bottom of the container via the monitoring well) is used to evaluate the efficiency of the bone char treatment tested in container #5.

Column Testing in Laboratory

The containers were tested in the field for three years and half and two years and half, while the column tests represented an infiltration equivalent of more than 311 years for metals and perchlorate and of more than 319 years for energetic materials. Table 1 below shows concentrations of contaminants in the input and output of the containers and the column tests. Input data are from the control whereas the output data are concentrations measured after water treatment with the reactive materials AC/BC, BC/AC and AC/BPM+CC. Data are expressed in intervals of minimum and maximum concentrations measured during the tests. The output concentrations in antimony and perchlorate exceeded the guidelines over the experiment (breakthrough). The time period corresponding to the breakthrough are expressed in brackets after the concentrations. The output concentrations observed in the outflows of column and containers were compared to drinking water guidelines and aquatic life criteria from Canadian Council of the Ministers of Environment (CCME) or Ministère de l'Environnement et de la Lutte aux changements climatiques du Québec (MELCC).

In general, metals input concentrations were one to two orders of magnitude higher in the column experiment than in field tests. The perchlorate input concentrations were much more variable (<0.5 to 44000 µg/L) in field tests than in the column tests (450-870 ug/L). Finally, the input concentrations in energetic material were also more variable in field conditions where the lowest concentrations were comparable with laboratory values, but the highest concentrations were one order of magnitude higher in the field tests.

Energetic Materials and Perchlorate

The energetic materials output concentrations were below the detection limit in all laboratory results, while RDX and HMX were detected in the AC/BC treatment in the field experiment, but at concentrations below the guidelines. The perchlorate output concentrations in field and laboratory were comparable between all treatments with values below the aquatic life criteria, excepted for field AC/BC treatment where a concentration of 11 µg/L was measured. The breakthrough arrived after the equivalent of more than 157 years in laboratory.

Cadmium

Containers with reactive material layer leached more cadmium than their control. No concentrations were above the drinking water guideline in containers outflows but the maximum concentrations recorded were above the aquatic life for all containers outflows, excepted #6 control. In column tests, the input concentrations in cadmium were one to two orders of magnitude higher than in container tests. Cadmium concentrations varied from below the detection limit to very low concentrations in all treatments indicating very good adsorption capacity for all treatments. Cadmium concentrations stayed below the aquatic life criteria for BC/AC and AC/BPM+CC column treatments but reach this criteria in a few samples of AC/BC treatment.

Copper

Containers with reactive materials presented higher copper concentrations than their controls during the first year of the experiment, indicating leaching. Thereafter, the copper concentrations in treatments #1 to #3 became lower than in #4 control, indicating adsorption. Input copper concentrations in the control of the column tests were one to two orders of magnitude higher than in the control of the container test. The treatments in the column tests showed high adsorption of copper with concentrations in the outflows sometimes above the aquatic life criteria. BC/AC and AC/BPM+CC seem to perform better than AC/BC in column tests (the maximum value of 17 µg/L corresponds to only one sample).

Lead

In containers, lead input concentrations measured in the outflow of the control was very low. It varied from no detection to one order of magnitude below the aquatic life criteria of 1 µg/L. Those input concentrations were too low to see any effect on treatments. Input concentrations of the column tests were 40 to 400 times higher than in the container tests. Adsorption of lead in column tests were high with all treatments having output concentrations below aquatic the life criteria.

Antimony

Antimony concentrations in the containers experiment were very low (0.2 µg/L) at the bottom of #4 control during the first 20 months and increased afterward to 25-54 µg/L. This retardation factor illustrates the slow dynamic of metal (oid)s in soil water in real field conditions. Antimony stayed at very low concentrations in containers with reactive material. Input antimony concentrations in the control column tests were much higher than in the control of the container tests. The treatments in the column tests showed high adsorption of antimony with concentrations in the outflows reaching the breakthrough (above drinking water criteria of 6 µg/L) after 55 years for the AC/BC and the BC/AC treatments. The AC/BPM+CC treatment was unable to treat antimony at all indicating that only bone char is able to adsorb antimony.

Zinc

Zinc concentrations in the input of the containers were lower than the aquatic life criteria. The outputs of treatments indicated no effect. Moreover, AC/BPM+CC may have leached some zinc. Most zinc concentrations in the treatment outputs were below the aquatic life criteria. In column tests, input concentrations were one order of magnitude higher than in the container tests. Adsorption of zinc were high with all treatments having output concentrations below the aquatic life criteria.

In summary, metal concentrations in the control of the container were too low to see the efficiency of the treatments tested. The only exception was Sb in #4 control, where concentrations above criteria appeared after one year and half. Column tests had input metals concentrations of one to two orders of magnitude higher than in the input container test (control). Results showed that all metals were adsorbed by the reactive materials, except for antimony that cannot be treated by AC/BPM+CC.

What is claimed is:

1. A system for treating a first contaminated aqueous flow comprising water and first munitions contaminants and a second contaminated aqueous flow comprising water and second munitions contaminants to decontaminate interstitial water that percolates through the earth under a destruction area, where munitions are exploded to produce the first munitions contaminants, and a burning area, where munitions are burned to produce the second munitions contaminants, the first contaminated aqueous flow being obtained by allowing a flow of water to fall on the first munitions contaminants, the second contaminated aqueous flow being obtained by allowing the flow of water to fall on second munitions contaminants, the system comprising:

granulate particles allowing the first contaminated aqueous flow to percolate down therethrough from the destruction area;

a first adsorption layer buried in the granulate particles and comprising at least one of bone char particulates, titanium dioxide particulates or aluminum oxide particulates for promoting adsorption of the first munitions contaminants upon contact of the first contaminated aqueous flow percolating towards the first adsorption layer and the first adsorption layer to produce a first treated aqueous flow depleted in the first munitions contaminants to further percolate into the granulate particles; and

TABLE 1

Comparison of Field Test Results and Laboratory Column Tests.

| | Applicable criteria | | Containers 2016 Min-Max | | Containers 2015 Min-Max (breakthrough years) | | | |
|---|---|---|---|---|---|---|---|---|
| | | | | | Input | Output | | |
| Parameters followed | Drinking water (µg/L) | Aquatic Life (µg/L) | Input #6 Control (µg/L) | Output #5 BC (µg/L) | #4 Control (µg/L) | #2 AC/BC (µg/L) | #3 BC/AC (µg/L) | #1 AC/ BPM + CC (µg/L) |
| RDX | 9 | 400 | <0.3-4000 | <0.3-2.7 | 74.6-40340 | <0.3-4.8 | <0.3->0.3 | <0.3-7.8 |
| HMX | 470 | 330 | <0.2-700 | <0.2 | 12.3-2860 | <0.2-2.2 | <0.2 | <0.2-0.9 |
| TNT | 1 | 120 | <0.2-450 | <0.2 | <0.2-5300 | <0.2 | <0.2 | <0.2 |
| CLO4 | 3 | — | <0.5-17000 | <0.5-0.6 | <0.5-44000 | <0.5-11 | <0.5-2.39 | <0.5-0.92 |
| Cd | 5 | 0.09 | 0.014-0.05 | <0.012-1.074 | 0.012-0.56 | <0.02-2.84 | <0.02-0.92 | 0.036-1.59 |
| Cu | 1000 | 2 | <0.0005-8.9 | 1.97-136 | 0.2-32.5 | 0.26-34.8 | 0.31-23.9 | 0.31-6.4 |
| Pb | 10 | 1 | <0.002-0.367 | <0.002-2.14 | <0.002-0.34 | <0.002-1.22 | <0.002-10.4 | <0.03-1.36 |
| Sb | 6 | 2000 | 0.021-0.149 | 0.164-0.95 | 0.034-54.1 | 0.026-0.22 | 0.02-0.2 | <0.005-1.63 |
| Zn | 5000 | 30 | 0.94-9.2 | <0.0004-17 | 0.4-10.6 | 0.66-16.4 | 0.5-8.4 | 2.81-44.5 |

| | | Column Min-Max (breakthrough years) Output | | |
|---|---|---|---|---|
| Parameters followed | Input (µg/L) | AC/BC (µg/L) | BC/AC (µg/L) | AC/BPM + CC (µg/L) |
| RDX | 840-2380 | <0.3 | <0.3 | <0.3 |
| HMX | 200-730 | <0.2 | <0.2 | <0.2 |
| TNT | 40-560 | <0.2 | <0.2 | <0.2 |
| CLO4 | 450-870 | <0.5-420 (157) | <0.5-430 (182) | <0.5-540 (171) |
| Cd | 0.29-43.7 | <0.0018-0.35 | <0.0026-0.031 | <0.0026-0.032 |
| Cu | 20.4-89.0 | 0.22-17 | 0.3-3.44 | 0.45-3.98 |
| Pb | 4.4-41.6 | 0.012-0.88 | 0.006-0.139 | 0.0074-0.18 |
| Sb | 35.4-320 | 0.007-94 (55) | 0.078-77.1(54) | 7.49-220 (0) |
| Zn | 20.6-280 | 1.8-17.4 | 1-10.6 | 0.089-14.8 |

<correspond to the detection limit

Although the present invention has been described hereinabove by way of specific embodiments thereof, it can be modified, without departing from the spirit and nature of the subject invention defined in the appended claims a second adsorption layer comprising at least one of bone char particulates, titanium dioxide particulates or aluminum oxide particulates for promoting adsorption of the second munitions contaminants upon contact of the second contaminated aqueous flow and the second adsorption layer to produce a second treated aqueous flow depleted in the second munitions contaminants.

2. The system of claim 1, further comprising a water treatment unit configured to receive and treat the first and the second contaminated aqueous flows, the water treatment unit comprising the second adsorption layer; and wherein the water treatment unit comprises:
an inlet pipe having a first end for receiving the first and the second contaminated aqueous flow, and a second end, the inlet pipe being configured to expel the first and the second contaminated aqueous flow towards the second adsorption layer; and
an outlet pipe having a first end and a second end for expelling the treated water flow depleted in the first and/or the second munitions contaminants therefrom, the outlet pipe being configured to receive the treated aqueous flow depleted in the munitions contaminants produced by the second adsorption layer for flow therethrough.

3. The system of claim 1, further comprising an impermeable membrane impervious to the first contaminated aqueous flow being buried in the granulate particles, the impermeable membrane being configured to collect the first contaminated aqueous flow percolating through the granulate particles towards the impermeable membrane for flow towards the second adsorption layer to produce the second treated aqueous flow depleted in the first munitions contaminants and in the second munitions contaminants.

4. The system of claim 3, wherein the first adsorption layer is buried in the granulate particles in vertical alignment with the destruction area.

5. The system of claim 4, wherein the impermeable membrane is buried in the granulate particles in vertical alignment with the destruction area.

6. The system of claim 1, wherein the burning area comprises a floor having an outlet in a lower section thereof for expelling the second contaminated aqueous flow from the burning area.

7. The system of claim 6, further comprising a first pipe having a first end in fluid communication with the outlet of the floor, and a second end in fluid communication with the second adsorption layer, allowing the second contaminated aqueous flow to flow therethrough and towards the second adsorption layer.

8. The system of claim 7, further comprising a second pipe having a first end in fluid communication with an impermeable membrane and a second end in fluid communication with the second adsorption layer, allowing the first contaminated aqueous flow percolating towards the impermeable membrane to flow therethrough and towards the second adsorption layer.

9. The system of claim 8, wherein the impermeable membrane has a membrane outlet formed in a membrane lower section thereof, the first end of the second pipe being coupled therewith.

10. The system of claim 9, wherein the impermeable membrane defines a downward slope to allow the first contaminated aqueous flow to flow towards the membrane outlet and then, towards the second pipe.

11. The system of claim 8, wherein the second adsorption layer is located below from the impermeable membrane, allowing the second pipe to be filled by gravity.

12. The system of claim 7, wherein the second adsorption layer is located below from the floor of the burning area, allowing the first pipe to be filled by gravity.

13. The system of claim 8, wherein the impermeable membrane comprises polyethylene.

14. The system of claim 8, wherein the impermeable membrane comprises bentonite.

15. The system of claim 8, wherein the impermeable membrane extends outwardly from a periphery of the first adsorption layer.

16. The system of claim 8, wherein the adsorption layer extends outwardly from a periphery of the impermeable membrane.

17. The system of claim 8, wherein the first adsorption layer is buried deeper in the granulate particles than the impermeable membrane.

18. The system of claim 8, wherein the impermeable membrane is buried deeper in the granulate particles than the first adsorption layer.

19. The system of claim 1, wherein the granulometry of the at least one of the bone char particulates, the titanium dioxide particulates or the aluminum oxide particulates is between about 0.1 mm and about 3.0 mm, or between about 0.5 mm and about 2.0 mm.

20. The system of claim 1, further comprising an impermeable membrane impervious to the first contaminated aqueous flow being buried in the granulate particles, the impermeable membrane being configured to provide direction of the first contaminated aqueous flow which percolates through the granulate particles towards the first adsorption layer.

21. The system of claim 1, wherein the second adsorption layer further promotes adsorption of the first munitions contaminants upon contact of the first contaminated aqueous flow and the second adsorption layer to produce a second treated aqueous flow depleted in the first munitions contaminants and in the second munitions contaminants.

* * * * *